(12) United States Patent
Jandrell

(10) Patent No.: US 7,057,553 B2
(45) Date of Patent: Jun. 6, 2006

(54) METHOD AND SYSTEM FOR PROCESSING POSITIONING SIGNALS IN A STAND-ALONE MODE

(75) Inventor: Louis Henry Martin Jandrell, Plano, TX (US)

(73) Assignee: Fast Location.Net, LLC, Dallas, TX (US)

( * ) Notice: Subject to any disclaimer, the term of this patent is extended or adjusted under 35 U.S.C. 154(b) by 372 days.

(21) Appl. No.: 10/659,903

(22) Filed: Sep. 11, 2003

(65) Prior Publication Data

US 2005/0035904 A1 Feb. 17, 2005

Related U.S. Application Data

(62) Division of application No. 09/908,011, filed on Jul. 18, 2001, now Pat. No. 6,628,234.

(51) Int. Cl.
*G01S 5/14* (2006.01)

(52) U.S. Cl. .................................. 342/357.12
(58) Field of Classification Search ............. 342/357.12
See application file for complete search history.

(56) References Cited

U.S. PATENT DOCUMENTS

| 4,241,411 A | 12/1980 | Krasner et al. ............. 364/726 |
| 5,043,736 A | 8/1991 | Darnell et al. ............. 342/357 |
| 5,271,034 A | 12/1993 | Abaunza ........................ 375/1 |
| 5,276,496 A | 1/1994 | Heller et al. ................ 356/141 |
| 5,355,222 A | 10/1994 | Heller et al. ................ 356/375 |

(Continued)

FOREIGN PATENT DOCUMENTS

| CA | 2260762 | 5/1998 |
| EP | 1 014 107 A2 | 6/2000 |
| GB | 2 292 257 A | 2/1996 |
| GB | 2321833 | 8/1998 |
| WO | WO 97/14054 | 4/1997 |

(Continued)

OTHER PUBLICATIONS

Eynon, A.J. et al, "A Comparison of Multiple–Dwell Cell Testing Strategies in Seiral Search Direct Sequence Spread Spectrum Code Acquisition," IEEE Military Communications Conference MILCOM 1995, Nov. 1985, pp. 357–361 vol. 1.*

(Continued)

*Primary Examiner*—Gregory C. Issing
(74) *Attorney, Agent, or Firm*—Baker Botts L.L.P.

(57) ABSTRACT

A method for processing positioning signals in a ranging receiver in a stand-alone mode is provided. The method includes collecting pseudorange samples from positioning signals received at the ranging receiver from a plurality of satellites. The pseudorange samples comprise message data modulation. Each satellite has an associated Gold code. A previously determined carrier frequency offset (CFO) is selected from a plurality of directly extracted CFOs. The pseudorange samples are compensated for the selected CFO. The message data modulation is removed from the pseudorange samples. The pseudorange samples are stacked for each satellite. The Gold code associated with each satellite is correlated to generate a pseudorange time sequence for the satellite. A determination is made regarding whether an adequate correlation peak exists in each pseudorange time sequence. A pseudorange is determined for the ranging receiver based on the correlation peaks when an adequate correlation peak exists in each pseudorange time sequence.

24 Claims, 16 Drawing Sheets

U.S. PATENT DOCUMENTS

| | | | |
|---|---|---|---|
| 5,387,993 A | 2/1995 | Heller et al. ............... 359/155 |
| 5,388,147 A | 2/1995 | Grimes ...................... 379/59 |
| 5,394,155 A | 2/1995 | Rubin et al. ................ 342/192 |
| 5,457,729 A | 10/1995 | Hamann et al. .............. 379/2 |
| 5,477,458 A | 12/1995 | Loomis ..................... 364/449 |
| 5,479,482 A | 12/1995 | Grimes ...................... 379/59 |
| 5,525,999 A | 6/1996 | King et al. ................ 342/357 |
| 5,548,637 A | 8/1996 | Heller et al. .............. 379/201 |
| 5,555,286 A | 9/1996 | Tendler ..................... 379/59 |
| 5,572,195 A | 11/1996 | Heller et al. .......... 340/825.35 |
| 5,587,716 A | 12/1996 | Sheynblat .................. 342/357 |
| 5,606,736 A | 2/1997 | Hasler et al. .............. 455/314 |
| 5,638,379 A | 6/1997 | Narasimha et al. .......... 371/5.4 |
| 5,646,519 A | 7/1997 | Hamilton et al. ........ 324/76.82 |
| 5,654,717 A | 8/1997 | Nichols et al. ............ 342/357 |
| 5,659,596 A | 8/1997 | Dunn ........................ 455/456 |
| 5,663,734 A | 9/1997 | Krasner ..................... 342/357 |
| 5,686,925 A | 11/1997 | Maeda et al. ............... 342/357 |
| 5,689,238 A | 11/1997 | Cannon, Jr. et al. ........ 340/568 |
| 5,689,271 A | 11/1997 | Lennen ..................... 342/357 |
| 5,691,726 A | 11/1997 | Nichols et al. ............. 342/357 |
| 5,734,966 A | 3/1998 | Farrer et al. ................ 455/63 |
| 5,740,538 A | 4/1998 | Joyce et al. ............... 455/456 |
| 5,751,777 A | 5/1998 | Zampetti .................... 375/376 |
| 5,764,704 A | 6/1998 | Shenoi ...................... 375/324 |
| 5,781,156 A | 7/1998 | Krasner ..................... 342/357 |
| 5,812,087 A | 9/1998 | Krasner ..................... 342/357 |
| 5,825,327 A | 10/1998 | Krasner ..................... 342/357 |
| 5,828,670 A | 10/1998 | Narasimha et al. ......... 370/516 |
| 5,831,574 A | 11/1998 | Krasner ..................... 342/357 |
| 5,831,577 A | 11/1998 | Nichols et al. ............. 342/357 |
| 5,832,375 A | 11/1998 | Leisten et al. .............. 455/314 |
| 5,841,396 A | 11/1998 | Krasner ..................... 342/357 |
| 5,854,608 A | 12/1998 | Leisten ..................... 343/895 |
| 5,859,621 A | 1/1999 | Leisten ..................... 343/895 |
| 5,873,048 A | 2/1999 | Yun ......................... 455/562 |
| 5,874,914 A | 2/1999 | Krasner ..................... 342/357 |
| 5,884,214 A | 3/1999 | Krasner ..................... 701/207 |
| 5,890,068 A | 3/1999 | Fattouche et al. .......... 455/456 |
| 5,897,605 A | 4/1999 | Kohli et al. ................ 701/213 |
| 5,899,957 A | 5/1999 | Loomis ..................... 701/214 |
| 5,900,838 A | 5/1999 | Khan et al. ................ 342/457 |
| 5,901,171 A | 5/1999 | Kohli et al. ................ 375/200 |
| 5,909,640 A | 6/1999 | Farrer et al. ................ 455/63 |
| 5,912,644 A | 6/1999 | Wang ........................ 342/457 |
| 5,913,170 A | 6/1999 | Wortham .................... 455/457 |
| 5,917,383 A | 6/1999 | Tso et al. ................... 331/57 |
| 5,918,181 A | 6/1999 | Foster et al. ............... 455/456 |
| 5,926,745 A | 7/1999 | Threadgill et al. ......... 455/12.1 |
| 5,929,752 A | 7/1999 | Janky et al. ............... 340/426 |
| 5,943,381 A | 8/1999 | Zampetti .................... 375/376 |
| 5,945,944 A | 8/1999 | Krasner .................. 342/357.06 |
| 5,945,963 A | 8/1999 | Leisten ..................... 343/895 |
| 5,963,180 A | 10/1999 | Leisten ..................... 343/895 |
| 5,999,124 A | 12/1999 | Sheynblat .............. 342/357.09 |
| 6,002,363 A | 12/1999 | Krasner ................... 342/357.1 |
| RE36,530 E | 1/2000 | Heller et al. ............... 359/155 |
| 6,014,109 A | 1/2000 | Raby ........................ 343/765 |
| 6,016,119 A | 1/2000 | Krasner .................. 342/357.06 |
| 6,040,798 A | 3/2000 | Kinal et al. ........... 342/357.01 |
| 6,041,280 A | 3/2000 | Kohli et al. ............... 701/201 |
| 6,044,257 A | 3/2000 | Boling et al. .............. 455/404 |
| 6,052,081 A | 4/2000 | Krasner ................. 342/357.02 |
| 6,061,018 A | 5/2000 | Sheynblat .............. 342/357.06 |
| 6,064,336 A | 5/2000 | Krasner .................. 342/357.05 |
| RE36,791 E | 7/2000 | Heller ........................ 342/450 |
| 6,100,806 A | 8/2000 | Gaukel .................... 340/573.4 |
| 6,104,340 A | 8/2000 | Krasner .................. 342/357.1 |
| 6,127,945 A | 10/2000 | Mura-Smith ............... 340/988 |
| 6,144,336 A | 11/2000 | Preston et al. ......... 342/357.09 |
| 6,191,730 B1 | 2/2001 | Nelson, Jr. ............. 342/357.05 |
| 6,205,377 B1 | 3/2001 | Lupash et al. ................ 701/13 |
| 6,226,510 B1 | 5/2001 | Boling et al. ............... 455/404 |
| 6,236,354 B1 | 5/2001 | Krasner .................. 342/357.06 |
| 6,285,316 B1 | 9/2001 | Nir et al. ............... 342/357.09 |
| 6,289,041 B1 * | 9/2001 | Krasner ...................... 375/152 |
| 6,295,023 B1 * | 9/2001 | Bloebaum .............. 342/357.06 |
| 6,297,771 B1 | 10/2001 | Gronemeyer ............... 342/378 |
| 6,298,229 B1 | 10/2001 | Tomlinson, Jr. et al. .... 455/404 |
| 6,327,534 B1 | 12/2001 | Levanon et al. ............ 701/215 |
| 6,331,836 B1 | 12/2001 | Jandrell ................. 342/357.12 |
| 6,334,061 B1 | 12/2001 | Cunningham et al. ...... 455/553 |
| 6,498,585 B1 | 12/2002 | Jandrell ................. 342/357.12 |
| 6,515,620 B1 | 2/2003 | Jandrell ................. 342/357.12 |
| 6,529,160 B1 | 3/2003 | Jandrell ................. 342/357.12 |
| 6,606,346 B1 * | 8/2003 | Abraham et al. ........... 375/142 |
| 6,628,234 B1 | 9/2003 | Jandrell ................. 342/357.12 |
| 6,847,676 B1 * | 1/2005 | Ng et al. .................... 375/142 |

FOREIGN PATENT DOCUMENTS

| | | |
|---|---|---|
| WO | WO 97/14056 | 4/1997 |
| WO | WO 97/21109 | 6/1997 |
| WO | WO 98/02973 | 1/1998 |
| WO | WO 98/53573 | 11/1998 |
| WO | WO 99/53338 | 10/1999 |
| WO | WO 99/56144 | 11/1999 |
| WO | WO 99/56145 | 11/1999 |
| WO | WO 02/16961 A2 | 2/2002 |

OTHER PUBLICATIONS

Carlson, A.B., "Communication Systems" 1986, McGraw–Hill, Third Edition, 1986 pp. 106–113, ISBN 0–07–100560–9, XP002195669, 8 pages.

U.S. Appl. No. 09/421,427, entitled "An Apparatus and Method for Geolocating a Remote Device," filed Oct. 19, 1999, 45 pages, Abandoned.

U.S. Appl. No. 09/421,188, entitled "An Apparatus and Method for Geolocating a Remote Device Making an Emergency Call," filed Oct. 19, 1999, 22 pages, Abandoned.

U.S. Appl. No. 09/909,274, entitled "Method and System for Processing Positioning Signals with Matching Assistance," filed Jul. 18, 2001, 142 pages, Abandoned.

"*Airbiquity Secures $16 Million Round "D" Financing Global Giant Shell's Equity Infusion Caps Successful Fund Raising Efforts*", News Release, London, England, and Bainbridge Island, Washington, 2 pages, Nov. 27, 2001.

Airbiquity aqLink™ Specification Sheet, 1 page, 2001.

"*Airbiquity Inc.—battery/GPS attachment*", pulver.com's Wireless Internet Report, 1 page, Feb. 19, 2001.

gpsAccessory, specification sheet, 2 pages, 2000.

Hesseldahl, Arik, "*Taking the World by Hand*", Forbes, pp. 90 and 92, Oct. 27, 2003.

* cited by examiner

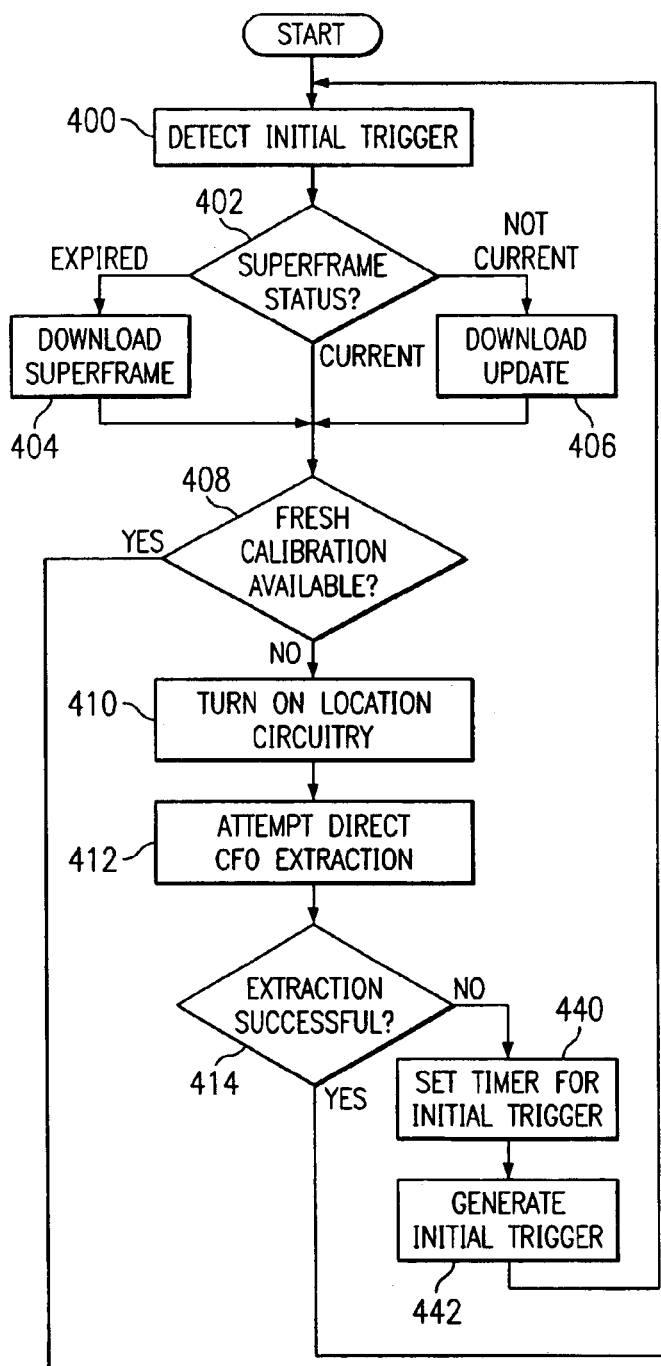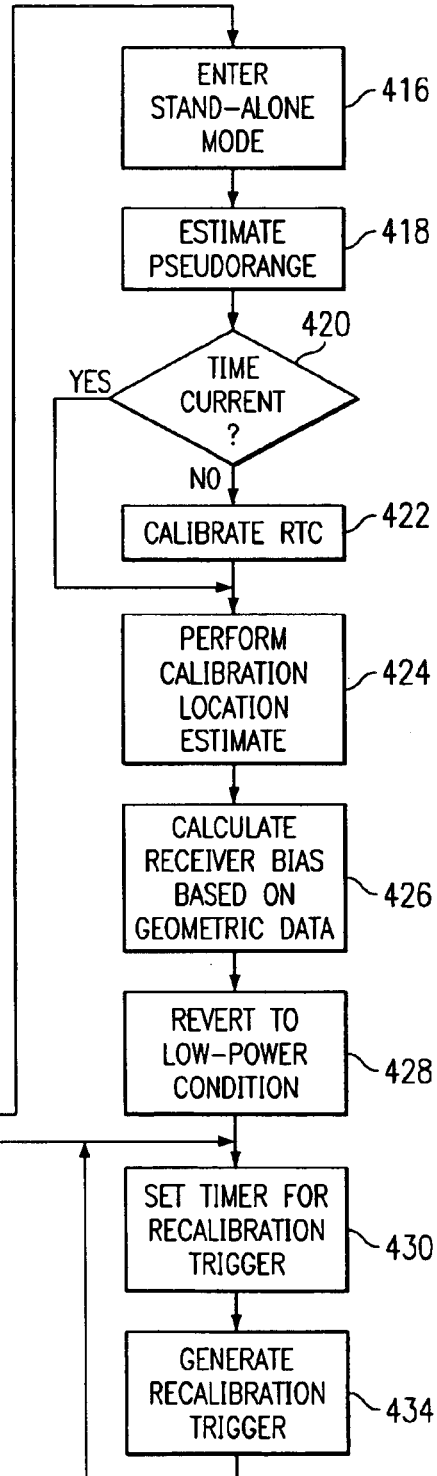
FIG. 4

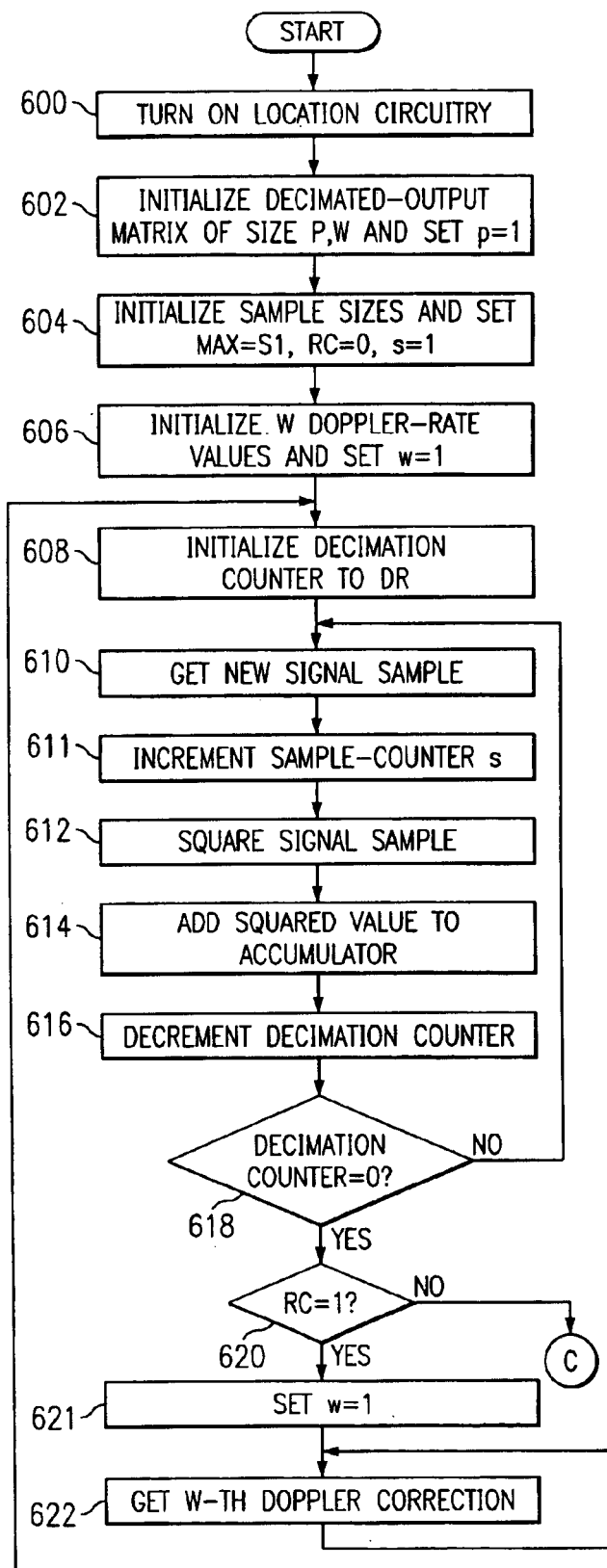
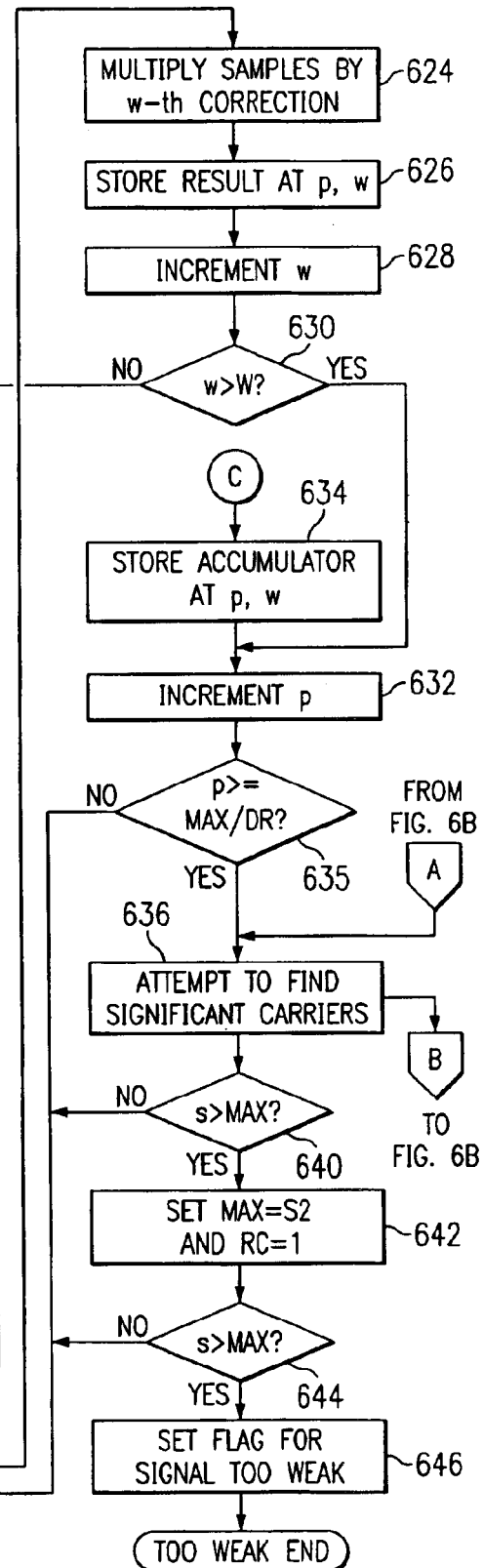
FIG. 6A

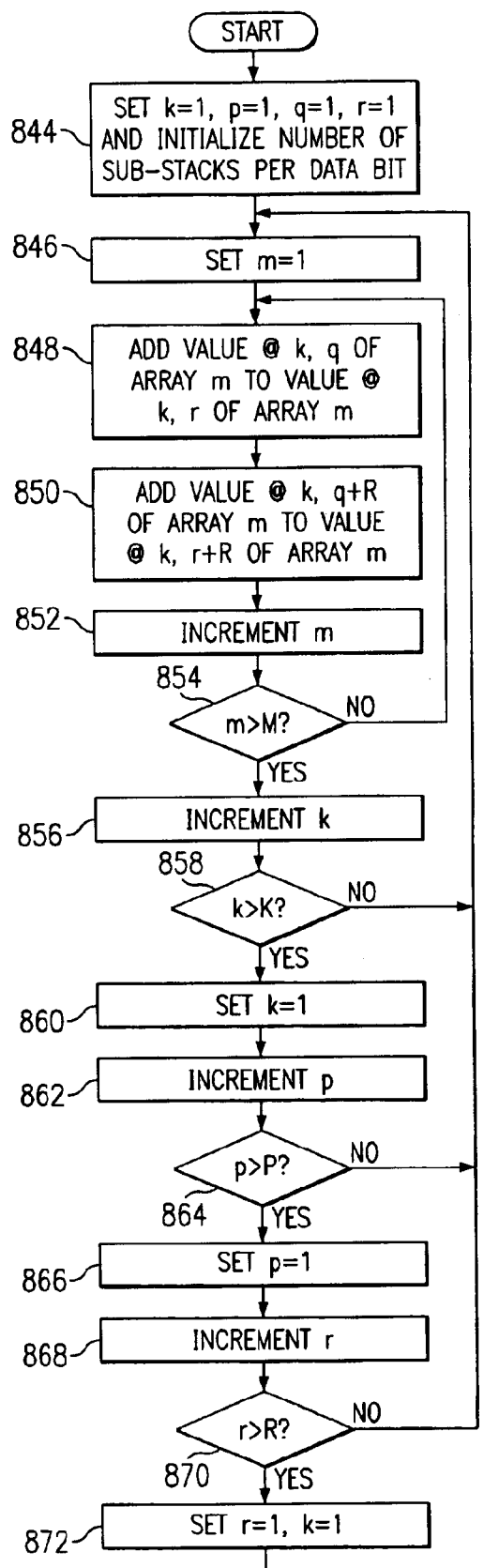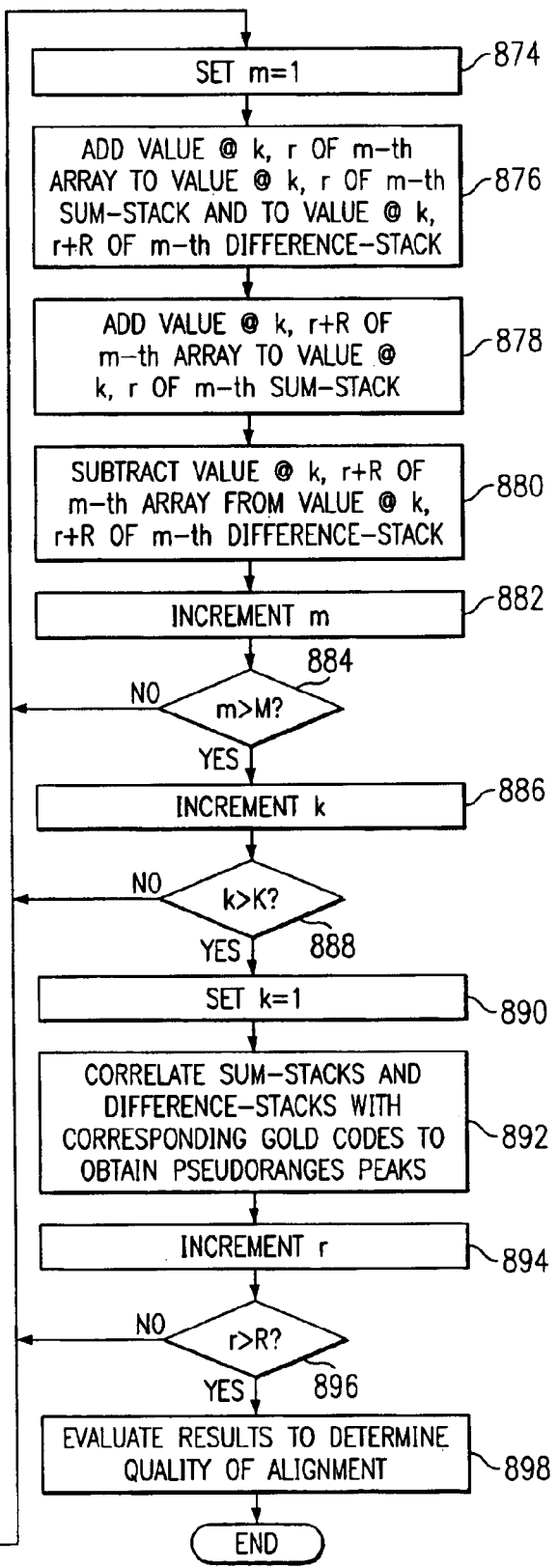
FIG. 8B

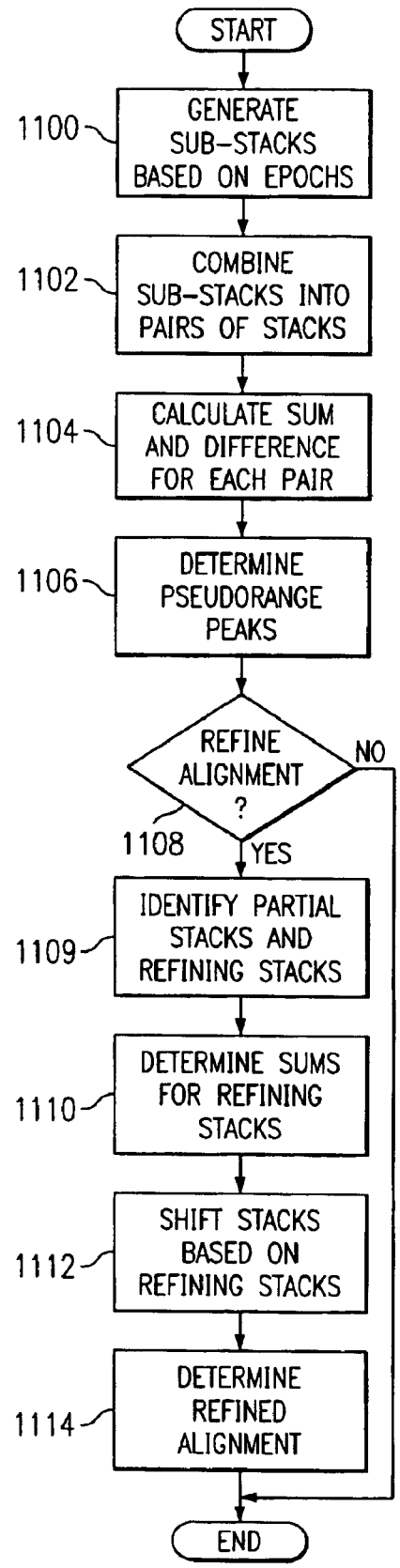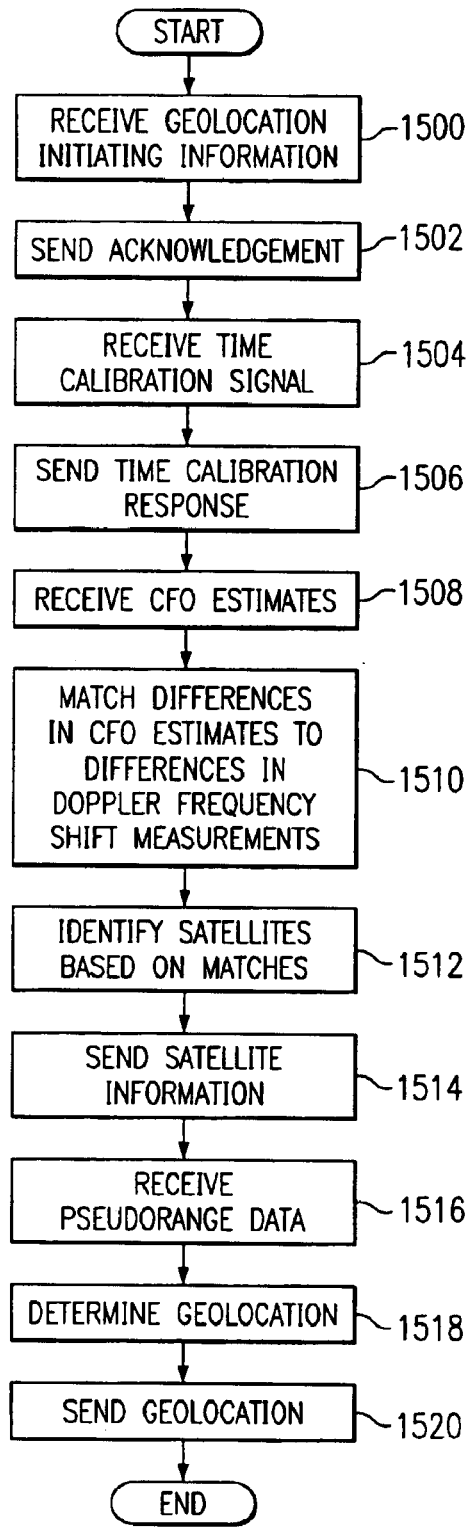

METHOD AND SYSTEM FOR PROCESSING POSITIONING SIGNALS IN A STAND-ALONE MODE

RELATED APPLICATIONS

This application is a divisional of U.S. patent application Ser. No. 09/908,011, filed Jul. 18, 2001 by Louis Henry Martin Jandrell and ENTITLED "METHOD AND SYSTEM FOR PROCESSING POSITIONING SIGNALS IN A STAND-ALONE MODE," now U.S. Pat. No. 6,628,234.

This application is related to U.S. patent application Ser. No. 09/909,274, filed Jul. 18, 2001, entitled "METHOD AND SYSTEM FOR PROCESSING POSITIONING SIGNALS WITH MATCHING ASSISTANCE" now abandoned; U.S. patent application Ser. No. 09/908,403, filed Jul. 18, 2001, entitled "METHOD AND SYSTEM FOR PROCESSING POSITIONING SIGNALS IN A GEOMETRIC MODE," now U.S. Pat. No. 6,515,620 B1 issued Feb. 4, 2003 ; and U.S. patent application Ser. No. 09/908,199, filed Jul. 18, 2001, entitled "METHOD AND SYSTEM FOR DETERMINING CARRIER FREQUENCY OFFSETS FOR POSITIONING SIGNALS," now U.S. Pat. No. 6,529,160 B2 issued Mar. 4, 2003.

TECHNICAL FIELD OF THE INVENTION

This invention relates generally to the field of geolocation and more particularly to a method and system for processing positioning signals in a stand-alone mode.

BACKGROUND OF THE INVENTION

In the application of global positioning system (GPS) technology to the geolocation of wireless devices, a typical geolocation function utilizes a course acquisition (C/A) code, or Gold code, which is received repeatedly from GPS satellites, in order to determine position. In addition to the repeated Gold code sequence, the Gold code comprises satellite message data that is modulated on top of the Gold code signal by inverting the phase according to the message data.

The spectral density level of a signal from a GPS satellite received at a conventional GPS receiver with a direct line-of-sight to the satellite is significantly less than the thermal noise level of the conventional GPS receiver. When satellite signals are received at wireless devices being operated with obstructed views of the sky and thus obstructed line-of-sight, the satellite signals are weakened even further. Consequently, the obstructed signal levels from satellites are generally well below the threshold at which receivers may receive reliable message data signals from the satellites.

Recent solutions to the problem of receiving weakened positioning signals provide for partitioning the geolocation processing functions such that some of these functions are performed at the unknown location which is to be determined and other functions are performed at a location with an unobstructed view of the signal source.

For example, one of these methods, using a satellite signal source, provides for measuring all the satellite signal parameters, including the Doppler shift for each satellite signal, at unobstructed receivers located near the unknown location. The unobstructed receivers then send pertinent data to the unknown location to allow pseudorange estimation to be completed at the unknown location.

Disadvantages associated with this example include a relatively expensive requirement of integration of the network of such receivers with the wireless carrier network that provides a link between the unknown location and the unobstructed receivers. In addition, this solution restricts the joint operation of the unknown location and the unobstructed receivers in performing the geolocation processing functions to only those carrier networks that are so integrated.

SUMMARY OF THE INVENTION

The present invention provides an improved method and system for processing positioning signals in a stand-alone mode. This invention substantially eliminates or reduces disadvantages and problems associated with previous systems and methods. In a particular embodiment, the time to estimate a pseudorange from received positioning signals is minimized, while the processing gain is maximized to facilitate rapid detection of positioning signals while minimizing the consumption of energy.

In accordance with one embodiment of the present invention, a method for processing positioning signals in a ranging receiver in a stand-alone mode is provided. The method includes collecting pseudorange samples from positioning signals received at the ranging receiver from a plurality of satellites. The pseudorange samples comprise message data modulation. Each satellite has an associated Gold code. A previously determined carrier frequency offset (CFO) is selected from a plurality of directly extracted CFOs. The pseudorange samples are compensated for the selected CFO. The message data modulation is removed from the pseudorange samples. The pseudorange samples are stacked for each satellite. The Gold code associated with each satellite is correlated to generate a pseudorange time sequence for the satellite. A determination is made regarding whether an adequate correlation peak exists in each pseudorange time sequence. A pseudorange is determined for the ranging receiver based on the correlation peaks when an adequate correlation peak exists in each pseudorange time sequence.

Technical advantages of one or more embodiments of the present invention include providing an improved method for processing positioning signals in a stand-alone mode. In particular, the time required to obtain pseudorange estimates from weakened positioning signals is minimized and the processing gain available in any sample segment used to obtain pseudorange information is maximized. In addition, by using a direct extraction method to quickly determine a CFO, resolving the identity of satellites whose signals are being received, and compensating the received signal by the amount of the CFO, the pseudorange estimation may be accomplished without performing a time-consuming search through the Doppler frequencies and satellite codes.

Other technical advantages of one or more embodiments of the present invention include a geolocation processor that may supply, to a receiver, current fragments of message data that were transmitted during the time the receiver was collecting signal samples. This is possible because the geolocation processor and the receiver are able to exchange time-of-day synchronizing information. As a result, the modulation for the message data may be removed from the samples being processed by the receiver. Accordingly, the available processing gain that can be achieved from a signal averaging process is maximized.

Due to the improvement in processing gain, technical advantages of one or more embodiments of the present invention also include an ability either to obtain greater sensitivity in a given amount of signal processing time or to significantly reduce the amount of processing time to reach a particular level of sensitivity. In this regard, a dynamic process is used that acquires only the amount of signal necessary to achieve reliable detection. This minimizes both the processing time and the amount of intermediate-result memory storage required during signal processing.

Yet another technical advantage of one or more embodiments of the present invention includes the removal of a requirement to integrate a geolocation processing system with the wireless carrier network that provides a communication link between the ranging receiver and an assisting function. Thus, the need for, and the costs associated with, a wireless carrier or plain old telephone system network are eliminated. For example, support from a carrier's network is not required to determine a coarse position estimation. In addition, a support network of nearby reference receivers, or its equivalent, is not required to provide Doppler-shift compensation or Doppler-shift search assistance. An end-to-end frequency-calibration embodiment in the wireless communication link between the receiver and the geolocation processor to allow making use of the Doppler-shift is also not required.

In addition, technical advantages of one or more embodiments of the present invention include minimized memory use, power consumption and network loading, increased sensitivity, decreased amount of time for a location estimate, and greater privacy for customers.

From the following figures, description, and claims, other technical advantages of the present invention will be readily apparent to one skilled in the art.

BRIEF DESCRIPTION OF THE DRAWINGS

For a more complete understanding of the present invention and its advantages, reference is now made to the following description taken in conjunction with the accompanying drawings, wherein like reference numerals represent like parts, in which:

FIG. 4 is a flow diagram illustrating a method for obtaining a calibration location estimate for the ranging receiver of FIGS. 1, 2 or 3 in accordance with one embodiment of the present invention;

FIGS. 6A and 6B are flow diagrams illustrating a direct extraction method for determining carrier frequency offset in the methods of FIGS. 4 and 5 in accordance with one embodiment of the present invention;

FIGS. 8A and 8B are flow diagrams illustrating a method for aligning message data to determine a pseudorange in the ranging receiver of FIGS. 1, 2 or 3 in a stand-alone mode in accordance with one embodiment of the present invention;

FIG. 11 is a flow diagram illustrating a method for aligning message data in the ranging receiver of FIGS. 1, 2 or 3 in accordance with one embodiment of the present invention;

FIG. 15 is a flow diagram illustrating a method for determining geolocation in the geolocation processor of FIG. 1 by providing matching assistance in accordance with one embodiment of the present invention.

DETAILED DESCRIPTION OF THE INVENTION

Figure 1:
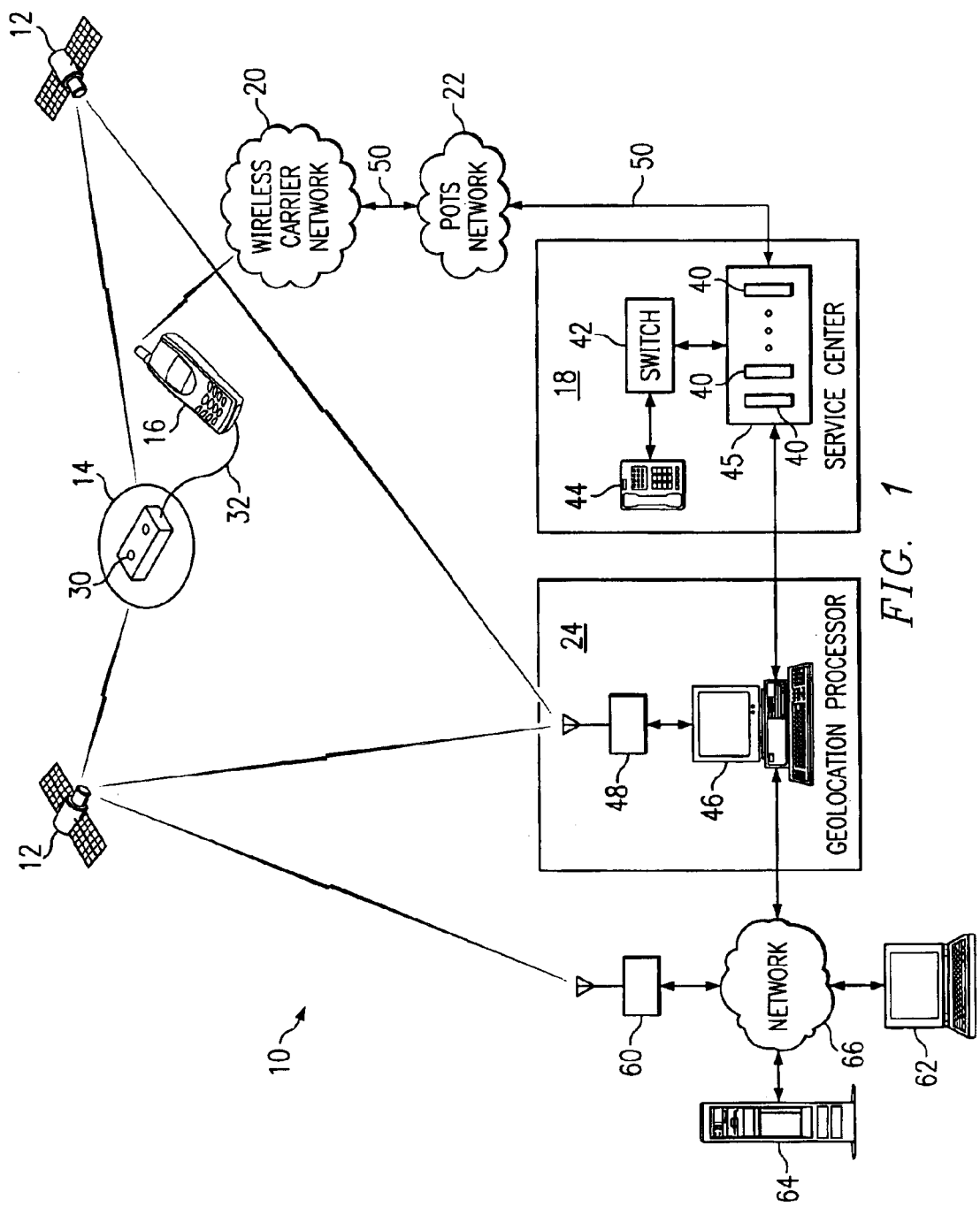
FIG. 1 is a block diagram illustrating a geolocation system operable to process positioning signals in accordance with one embodiment of the present invention.

FIG. 1 is a block diagram illustrating a remote geolocation system 10 in accordance with one embodiment of the present invention. The system 10 may comprise a global positioning system (GPS), a global navigation satellite system (GLONASS), or other suitable navigation system.

In the case of GPS, satellites in a navigation constellation all transmit on the same 1575.42 MHz frequency and use a code division multiple access (CDMA) technique to distinguish one satellite's signal from the others. In the case of the GPS constellation, a 1023-chip Gold code is biphase-modulated on the sinusoidal carrier. The Gold codes, unique to each satellite, are used for the CDMA and ranging functions. The chipping rate in this case is 1023 kHz, so that the transmission of the Gold Code repeats every millisecond. One cycle through the Gold Code is called a "code epoch." A set of samples whose duration is equal to the duration of a code epoch is referred to herein as an epoch. Navigation message data is modulated onto this Gold code modulated carrier signal by either inverting or not inverting the phase of the Gold code in sympathy with the values of the navigation message data bits. Each transmitted navigation message data bit coincides with 20 Gold code epochs, or 20 milliseconds.

The system 10 comprises a plurality of positioning signal transmitters 12 and at least one ranging receiver 14. The positioning signal transmitters 12 are operable to transmit positioning signals, and each ranging receiver 14 is operable to receive the positioning signals and to perform geolocation processing functions in order to determine a pseudorange estimate for the ranging receiver 14 based on the received signals. As used herein, "each" means every one of at least a subset of the identified items. In the illustrated embodiment, the positioning signal transmitters 12 comprise satellites 12. Thus, as used herein, "satellites" means conventional satellites, pseudolites, or other suitable positioning signal transmitters.

As described in more detail below, a location estimate, or geolocation, may be determined for the ranging receiver 14 based in part on the pseudorange estimate. According to one embodiment, a location estimate provides a location for the ranging receiver 14 that is accurate to within 10 to 50 meters or other suitable distance.

A location estimate may be determined when the ranging receiver 14 is receiving weakened positioning signals, such as signals weakened by obstructions. Weakened positioning signals comprise signals that are received from the satellites 12 at levels that result in insufficient information being received by the ranging receiver 14, in the absence of other satellite signals or other sources of information, to determine a location estimate but sufficient information being received to estimate a pseudorange for the ranging receiver 14. According to one embodiment, weakened positioning signals comprise signals compromised up to 16 dB below "clear view", or unobstructed, signal levels. In an alternative embodiment, weakened positioning signals comprise signals compromised up to 30 dB below "clear view" signal levels.

The system 10 also comprises a wireless device 16 and a service center 18 which may be coupled to each other through a wireless carrier network 20 and the plain old telephone system (POTS) network 22. In addition, the system 10 comprises a geolocation processor 24, which may be coupled to the service center 18 either directly or indirectly, such as through a network or other suitable form of indirect communication and may be coupled through the service center 18 to the wireless device 16. Although the illustrated embodiment includes one service center 18 and one geolocation processor 24, it will be understood that the system 10 may comprise any suitable number of the components 18 and 24 without departing from the scope of the present invention and that functionality of the system 10 may be otherwise suitably distributed or combined. It will be further understood that a single geolocation processor 24 may be coupled to a plurality of service centers 18 without departing from the scope of the present invention.

The wireless device 16 may be coupled to the ranging receiver 14, which may comprise push buttons 30, or other suitable interfaces, for user operation such as to initiate a location estimating process for the ranging receiver 14. The wireless device 16 is operable to provide a communication link between the ranging receiver 14 and a service center 18 via the wireless carrier network 20 and the POTS network 22 and to provide a communication link between the ranging receiver 14 and a geolocation processor 24 via the service center 18.

The wireless device 16 may comprise a cellular telephone, a wireless Personal Digital Assistant, a two-way or response pager, a private or commercial vehicle tracking system, an "On-Star" type motorist service network, a private or commercial wireless data network (or a device in such a network), or any other suitable device or network capable of providing a data-link between the ranging receiver 14 and the geolocation processor 24.

The wireless device 16 may be coupled to the ranging receiver 14 in any suitable fashion. For example, the wireless device 16 and the ranging receiver 14 may be coupled together by a cable 32. Alternatively, the ranging receiver 14 may be located near the wireless device 16 and linked to the wireless device 16 by a low-powered short-range wireless link, such as those provided by the Blue-Tooth protocols. The ranging receiver 14 may also be coupled to the body of the wireless device 16 as a "stick-on" attachment, or the ranging receiver 14 may be built into a receptacle such that the wireless device 16 is in electrical contact with the ranging receiver 14 when the wireless device 16 is inserted into the receptacle.

In another alternative, the ranging receiver 14 may be integrated with the wireless device 16. For this embodiment, the wireless device 16 is operable to process communication at a minimum of two frequencies, one frequency for receiving signals to be processed by the wireless device 16 independently of the functionality of the ranging receiver 14, such as cellular signals for a wireless device 16 comprising a cellular telephone, and a second frequency for receiving positioning signals. The wireless device 16 is also operable to digitize samples at a rate corresponding to the rate at which the ranging receiver 14 may process samples in accordance with the present invention. For example, the wireless device 16 may be operable to digitize samples at a rate of at least 2.048 Megasamples/second at a quantizer resolution of a minimum of two bits. It will be understood that other suitable rates may be used, as described in more detail below in connection with FIG. 2. In addition, the wireless device 16 may include additional memory, as compared to a wireless device 16 not coupled to a ranging receiver 14, in order to store samples for processing during pseudorange estimation.

The service center 18 may comprise a Public Safety Access Point (PSAP), a Vehicle Dispatch Application, or other suitable entity capable of facilitating geolocation processing for the ranging receiver 14 by coupling the ranging receiver 14 to the geolocation processor 24. The service center 18 is also operable to manage the detection, routing and switching or voice traffic that may be associated with the geolocation determination process.

The service center 18 includes a rack 45 of modems 40, a switch 42, and at least one telephone handset 44. Each modem 40 may include a Location Services Protocol modem or other suitable modem and is operable to provide a communication link between the service center 18 and the ranging receiver 14 associated with the wireless device 16 through the POTS network 22 and the wireless carrier network 20. The modem 40, or other communication link such as an Ethernet, may also provide a link between the service center 18 and the geolocation processor 24. Each modem 40 is also operable to route voice communication to the switch 42 and data communication to the geolocation processor 24. The switch 42 is operable to route voice communication from a modem 40 to a telephone handset 44 and from a telephone handset 44 to a modem 40. The telephone handset 44 allows an operator at the service center 18 to interact with a user of the wireless device 16 through voice communication provided through a modem 40.

The geolocation processor 24 is operable to identify the satellites 12 by matching the differences between pairs of carrier frequency offsets measured at the ranging receiver 14 with the differences between pairs of Doppler frequency shift estimates made of satellites in view at particular locations on the Earth's surface, to accurately calibrate a real-time clock in the ranging receiver 14, to track satellite message data from the satellites 12 and bit transition times in the satellite message data, to provide fragments of the satellite message data from the identified satellites 12 to the ranging receiver 14, to convert a pseudorange estimate from the ranging receiver 14 into a geolocation of the ranging receiver 14, and to provide the geolocation to a requester such as the ranging receiver 14 or PSAP operator.

The geolocation processor 24 comprises a workstation 46 and a receiver 48. The workstation 46 is operable to perform geolocation processing functions. The workstation 46 is also operable to obtain current ephemeris, time, and other suitable satellite message data from the receiver 48. Ephemeris data may comprise trajectory data received from one or more satellites 12 that allow positions of satellites in the satellite constellation to be predicted. The receiver 48 may comprise a GPS receiver or other suitable receiver operable to receive positioning signals from the satellites 12.

The wireless carrier network 20 may be operable to coordinate location management, authentication, service management, subscriber management, and any other suitable functions for a plurality of wireless devices 16. The wireless network 20 may comprise a public land mobile network or other suitable network operable to provide communication between the wireless devices 16 and the POTS network 22.

The POTS network 22 may be coupled to the wireless carrier network 20 and to the service center 18 through communication links 50. The communication links 50 may be any type of communication link capable of supporting data transfer. In one embodiment, each of the communication links 50 may comprise, alone or in combination, Integrated Services Digital Network, Asymmetric Digital Subscriber Line, T1 or T3 communication lines, hard-wire lines, telephone lines or wireless communication. It will be understood that the communication links 50 may comprise other suitable types of data communication links. The communication links 50 may also connect to a plurality of intermediate servers between the POTS network 22 and both the wireless carrier network 20 and the service center 18.

The system 10 may also comprise one or more remote receivers 60, service requesters 62 and/or application servers 64 which may be coupled to the geolocation processor 24 through a data network 66. The remote receiver 60 may comprise a GPS receiver or other suitable receiver operable to receive positioning signals from the satellites 12. Data derived from these positioning signals may then be provided to the geolocation processor 24 through the data network 66. Thus, the geolocation processor 24 may receive positioning signals from either receiver 48 or receiver 60. According to one embodiment, the system 10 comprises three or four remote receivers 60 spaced around the Earth such that, at any given time, the three remote receivers 60 may receive current ephemeris data from each satellite in the constellation.

The service requester 62 may comprise a location information requester that is operable to generate a request for a location estimate for a particular ranging receiver 14 and to provide the request to the application server 64 through the data network 66. The application server 64 may comprise a server for location-based applications or other suitable server that is operable to receive the request generated by the service requester 62 and to process the request.

In processing the request, the application server 64 is operable to provide the request to the geolocation processor 24 through the data network 66, prompting the geolocation processor 24 to initiate a location estimating process for the ranging receiver 14 identified by the service requester 62 in the request. In addition, the application server 64 is operable to receive a resulting location estimate from the geolocation processor 24 through the data network 66 and to provide the location estimate to the service requester 62 through the data network 66.

The data network 66 may comprise a public switched telephone network, an integrated services digital network, a local area network, a wide area network, a global computer network, such as the Internet or other dedicated switched network, or other communication system or combination of communication systems at one or more locations. According to one embodiment, any of the networks 20, 22 and 66 may share a same physical implementation with one or both of the other networks 20, 22 and 66.

Because the Doppler frequency shifts are continuously changing due to the movement of the Earth and of the satellites 12, the workstation 46 may be operable to regularly re-compute the pattern of Doppler frequency shifts of satellites 12 based on the changing satellite positions for use in satellite identification by Doppler frequency shift differences, as described in more detail below. The workstation 46 is also operable to track the satellite message data modulated on top of the Gold code ranging signal transmitted by each of the satellites 12 and to track the transition times of the satellite message data bit boundaries.

The satellites 12 comprise satellites of a navigational satellite constellation that are in view of the ranging receiver 14 and/or other receivers 48 and 60 at a particular time and that are operable to transmit positioning signals, such as navigation and ranging signals. It will be understood that the in-view satellites 12 of the satellite constellation continually change due to orbital movement of the satellites and rotational movement of the Earth. According to one embodiment, the system 10 comprises at least four satellites 12 at any particular time.

The ranging receiver 14, the service center 18, and the geolocation processor 24 may comprise logic encoded in media. The logic comprises functional instructions for carrying out program tasks. The media comprises computer disks or other computer-readable media, application-specific integrated circuits, field-programmable gate arrays, digital signal processors, other suitable specific or general-purpose processors, transmission media or other suitable media in which logic may be encoded and utilized.

In operation for a particular embodiment, the service center 18 provides data communication between the ranging receiver 14 and the geolocation processor 24 to allow the ranging receiver 14 to generate a pseudorange estimate and the geolocation processor 24 to generate a geolocation. In addition, the service center 18 provides voice communication between a user of the wireless device 16 and an operator at the service center 18. The service center 18 may manage emergency services, vehicle-dispatching services, or other suitable services which utilize geolocation processing to locate wireless devices 16. An operator at the service center 18 monitors and manages emergency calls, communications with vehicles via wireless devices 16, or other suitable communications.

The receiver 48 receives positioning signals from the satellites 12 and processes these signals. The workstation 46 determines the location of a wireless device 16 based on the signals received at the receiver 48 and based on information exchanged with the ranging receiver 14 via the wireless device 16 and the service center 18.

The telephone handset 44 allows an operator at service center 18 to call the wireless device 16 or to respond to an incoming call from the wireless device 16. Calls to the wireless device 16 may also be initiated by the workstation 46 via a modem 40. Each modem 40 provides data exchange capability with the ranging receiver 14 via the wireless device 16 over the same voice channel used by a caller to speak to the operator at the service center 18. According to one embodiment, each modem 40 also provides time-exchange facility with the ranging receiver 14 over the voice channel.

The process may begin by an exchange of time signals between the ranging receiver 14 and the geolocation processor 24 to establish a real time at the ranging receiver 14. This time is used to coordinate the use of further time-critical information to be exchanged between the ranging receiver 14 and the geolocation processor 24. While this time exchange is taking place between the ranging receiver 14 and the geolocation processor 24, the ranging receiver 14 may begin collecting and decimating satellite signal samples received from the satellites 12 for a carrier frequency estimating process. It will be understood that, in accordance with one embodiment of the present invention, the ranging receiver 14 may be operable to determine real time for geolocation processing from the positioning signals without exchanging time signals with the geolocation processor 24.

A direct method for quickly estimating the received carrier frequency for each of the satellites 12, including those of which the ranging receiver 14 has an obstructed view, may be used. According to one embodiment, this method uses signal squaring to remove the biphase modulation and uses narrow-band filtering to reduce the noise. In one embodiment, at least two bits per signal sample and a final stage of down-conversion to near baseband by a heterodyne step are used.

The received carrier frequency estimates include the down-conversion frequency uncertainty due to local oscillator manufacturing tolerances, thermal drift and/or other conditions, thereby providing a substantially exact frequency that may be applied to compensate for the Doppler frequency shift and these other errors, even over the long periods of signal averaging needed to reach the required sensitivity for successful signal detection.

In one embodiment of the invention, this direct determination of the received carrier frequencies to high resolution (within about one Hz for a one second sampling of the signals received from the satellites 12) allows the identity of satellites 12 contributing the specific pattern of Doppler-frequency differences, which are equal to the carrier frequency offset (CFO) differences, to be determined by a pattern match between the Doppler differences computed for the current positions of the satellites in the constellation and target matching patches on the surface of the Earth. This may be accomplished by sending the CFO results to the geolocation processor 24 as soon as they are determined by the ranging receiver 14, along with the time corresponding to the beginning of the collection of the signal samples from which the CFOs were determined. The ranging receiver 14 then continues collecting and storing samples of the signal that are suitable for estimating pseudorange.

While the signal samples for pseudorange estimation are being collected, the geolocation processor 24 identifies the satellites 12 that are in view at the unknown location and, for each of these satellites 12, extracts that portion of the satellite message data that is being transmitted during sample collection. The geolocation processor 24 may also identify the actual Doppler frequency shift frequency to be used in the time-dilation correction, as described in FIG. 13C. Time-dilation is proportional to the total accumulated Doppler frequency shift. The geolocation processor 24 then transmits to the ranging receiver 14 a satellite ID for each identified satellite 12 to enable rapid computation of pseudorange without searching through Doppler frequencies and satellite codes and transmits the satellite message data fragment to enable removal of the data modulation from the signals so that linear summation may be performed for increased processing gain.

Also while the ranging receiver 14 is collecting signal samples for pseudorange estimation, the ranging receiver 14 begins processing the signals for the pseudorange content.

Figure 2:
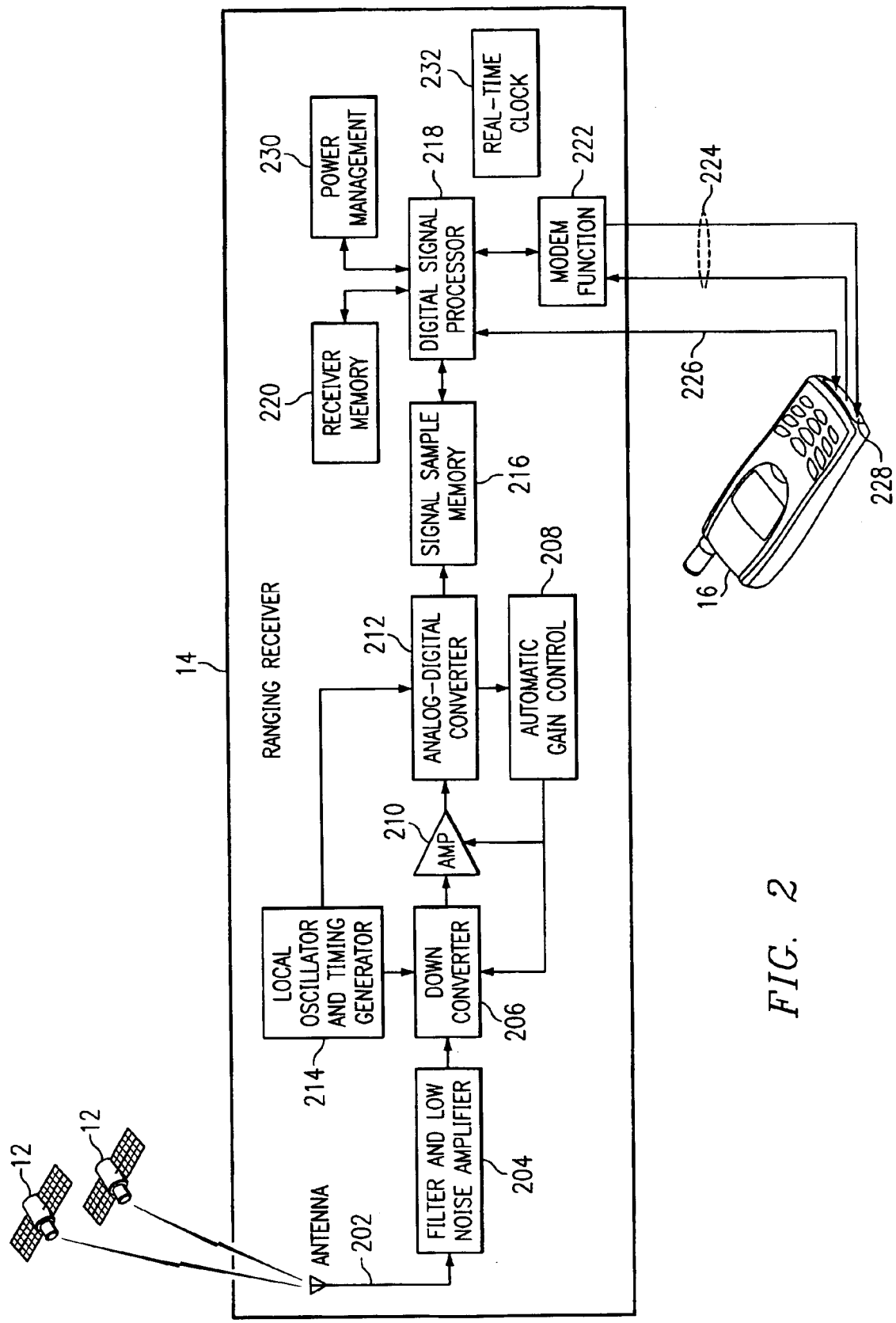
FIG. 2 is a block diagram illustrating the ranging receiver of FIG. 1 in accordance with one embodiment of the present invention.

FIG. 2 is a block diagram illustrating the ranging receiver 14 in accordance with one embodiment of the present invention. The ranging receiver 14 is a mobile device that may be easily transported from one location to another. In the illustrated embodiment, the ranging receiver 14 is coupled to a wireless device 16 that comprises a digital cellular telephone. However, as described in more detail above in connection with FIG. 1, the wireless device 16 may comprise any suitable device capable of wireless communication.

The ranging receiver 14 comprises an antenna 202 that is capable of receiving positioning signals. According to one embodiment, the antenna 202 comprises a GPS antenna that is capable of receiving GPS signals. For this embodiment, the antenna 202 may comprise a circularly polarized ceramic patch antenna or other suitable antenna. The antenna 202 is coupled to a filter and low-noise amplifier 204.

In one embodiment, the filter and low-noise amplifier 204 is operable to limit bandwidth to approximately 2 MHz (centered at 1575.42 MHz). The filter and low-noise amplifier 204 is coupled to a down-converter 206. The down-converter 206 is operable to down-convert the signal to baseband. According to one embodiment, the down-converter is operable to down-convert the signal using multiple stages of amplification, filtering and super-heterodyning. The down-converter 206 may comprise a radio frequency/intermediate frequency (RF/IF) down-converter or other suitable down-converter.

An automatic gain control 208 is coupled to the down-converter 206 and to an amplifier 210. The automatic gain control 208 controls the stages of amplification for the down-converter 206. The amplifier 210, which is also coupled to the down-converter 206, amplifies the signal from the down-converter 206 based on a control signal from the automatic gain control 208.

The amplifier 210 may be operable to limit bandwidth to approximately 1 MHz or to another suitable bandwidth less than 2 MHz. In this way, the signal-to-noise ratio may be improved as compared to a signal with a bandwidth of approximately 2 MHz. For example, for the embodiment in which the bandwidth is limited to approximately 1 MHz, a gain of about 3 dB made be obtained with a loss of about 50% of the noise and only about 10% of the signal.

An analog-to-digital converter 212 is coupled to the amplifier 210 and to the automatic gain control 208. The analog-to-digital converter 212 comprises a symmetrical multi-bit quantizer that is operable to digitize analog signals from the down-converter 206. The analog-to-digital converter 212 is symmetrical in order to minimize the generation of unnecessary harmonic products that may cause alias products in the band of the desired signal.

For example, the analog-to-digital converter 212 may digitize the signals at a minimum of 2.048 Megasamples/second and at a quantizer resolution of a minimum of two bits. Alternatively, the analog-to-digital converter 212 may digitize the signals at a minimum of 4.096 or 8.192 Megasamples/second, in order to improve pseudorange timing resolution, and then further into four or more bits, in-phase and quadrature-phase (I/Q) samples, in order to improve both frequency and amplitude resolution and to minimize the generation of harmonic products due to the inherent non-linearity of the quantizing process.

Symmetry may be ensured by biasing the quantizer levels such that zero crossing takes place in the center of the first quantizer level, allowing equal statistical representation of the signal in the positive and negative segments. This is especially useful for small numbers of bits of resolution.

An output of the analog-to-digital converter 212 controls the automatic gain control 208, which feeds back to the amplifier 210 and the down-converter 206 as described above. This may be used to ensure that, on average, the quantized signal reaches maximum quartile less than 30% of the time, which is consistent with the expected statistics of noise-like signals. However, it will be understood that this output of the analog-to-digital converter 212 may be used to ensure that the quantized signal reaches maximum quartile less than any suitable percentage of the time.

The ranging receiver 14 also comprises a local oscillator and timing generator 214 that is coupled to the down-converter 206 and to the analog-to-digital converter 212. The local oscillator and timing generator 214 may comprise a temperature-compensated crystal oscillator (TCXO), a digitally-compensated crystal oscillator (DCXO), or other suitable oscillator operable to drive a digital device. Various timing signals may be derived from the local oscillator and timing generator 214, such as frequencies for the various stages of down-conversion for the down-converter 206, the sampling clock for the analog-to-digital converter 212, and other suitable timing signals.

A signal sample memory 216 is coupled to the analog-to-digital converter 212. The signal sample memory 216 is operable to temporarily store digital signal samples from the analog-to-digital converter 212. For example, the signal sample memory 216 may comprise a random access memory (RAM) or other suitable data store.

The ranging receiver 14 also comprises a digital signal processor 218 that is coupled to the signal sample memory 216. The digital signal processor 218 comprises a processor operable to process stored instructions. For example, the digital signal processor 218 may comprise a Motorola DSP 56654 manufactured by MOTOROLA, INC. of Schaumburg, Ill., a Texas Instruments TMS 320VCSSIO manufactured by TEXAS INSTRUMENTS of Dallas, Tex., an ADSP 21161 SHARC DSP manufactured by ANALOG DEVICES of Norwood, Mass., or other suitable processor.

A receiver memory 220 is coupled to the digital signal processor 218. The receiver memory 220 is operable to store instructions and other data for the digital signal processor 218. The receiver memory 220 may comprise a plurality of program and working memories, which may comprise any suitable combination of read-only memories (ROMs), RAMs, and other suitable data stores. It will be understood that the receiver memory 220 may also comprise the signal sample memory 216.

A modem function 222 is coupled to the digital signal processor 218 and is operable to provide an interface through which communication may be provided between the digital signal processor 218 and the wireless device 16 and ultimately with a geolocation processor 24 through the wireless carrier network 20, the POTS network 22, and a service center 18.

Signal lines 224 and 226 couple the wireless device 16 to the modem function 222 and to the digital signal processor 218. According to the illustrated embodiment, the signal lines 224 and 226 are coupled to an external component 228 of the wireless device. It will be understood, however, that the signal lines 224 and 226 may be otherwise coupled to the wireless device 16 based on which embodiment of the ranging receiver 14 is implemented, as described above in connection with FIG. 1. For example, for the embodiment in which the ranging receiver 14 is an integral component of the wireless device 16, the signal lines 224 and 226 may comprise internal connections within the wireless device 16 which need not be coupled to an external component 228.

The ranging receiver 14 also comprises power management circuitry 230 that is coupled to the digital signal processor 218. The power management circuitry 230 may comprise one or more batteries or other suitable power sources. The power management circuitry 230 is operable to provide power to the ranging receiver 14 and to control the availability of power on the basis of control signals on the signal lines 224 and 226 from the wireless device 16 and/or other suitable control signals. The ranging receiver 14 also comprises a real-time clock 232 that is operable to be calibrated to a remote clock across a wireless link or based on satellite message data.

Figure 3:
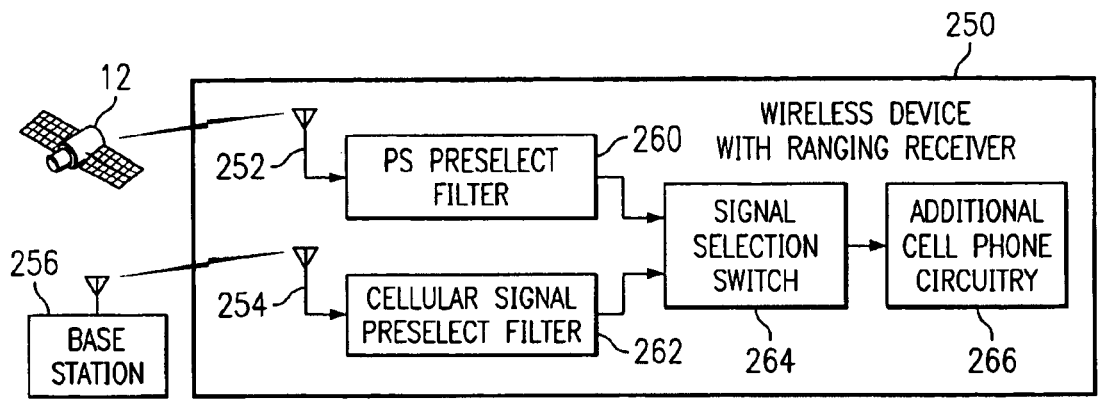
FIG. 3 is a block diagram illustrating the ranging receiver of FIG. 1 in accordance with another embodiment of the present invention.

FIG. 3 is a block diagram illustrating the ranging receiver 14 in accordance with another embodiment of the present invention. In the illustrated embodiment, an integrated device 250 comprises the function of a ranging receiver 14 integrated with a wireless device 16 that comprises a digital cellular telephone. However, as described in more detail above in connection with FIG. 1, the wireless device 16 may comprise any suitable device capable of wireless communication.

The integrated device 250 comprises an antenna 252 that is capable of receiving positioning signals. According to one embodiment, the antenna 252 comprises a GPS antenna that is capable of receiving GPS signals from the satellites 12. For this embodiment, the antenna 252 may comprise a circularly polarized ceramic patch antenna or other suitable antenna. The integrated device 250 also comprises an antenna 254 that is operable to communicate with a base station 256. Thus, for the digital cellular telephone embodiment, the antenna 254 is capable of receiving and transmitting cellular communication signals.

The antenna 252 is coupled to a positioning signal ("PS") preselect filter 260, and the antenna 254 is coupled to a cellular signal preselect filter 262. The output from each of the filters 260 and 262 is coupled to a signal selection switch 264.

The signal selection switch 264 is operable to select either the positioning signals or the cellular communication signals for processing by the integrated device 250. The output of the signal selection switch 264, which corresponds to the output of the filter 260 or 262 selected by the switch 264, is coupled to additional cell phone circuitry 266. The additional cell phone circuitry 266 is operable to process positioning signals as described above in connection with FIG. 2 and to process cellular communication signals in a manner similar to a standard wireless device 16 without an integrated ranging receiver 14.

FIG. 4 is a flow diagram illustrating a method for obtaining an initial calibration location estimate based on an initial trigger for the ranging receiver 14 in accordance with one embodiment of the present invention. The method begins at step 400 where the ranging receiver 14 detects an initial trigger.

A trigger may comprise a request generated by the wireless device 16 automatically, a request generated by a user of the wireless device 16 such as by pushing a button 30 on the ranging receiver 14, a request from an external source such as the Internet, a geolocation processor 24 or other suitable external source, or any other suitable trigger. The initial trigger detected in step 400 may comprise, for example, a trigger that is automatically generated in response to turning on the wireless device 16 that is coupled to the ranging receiver 14. In addition, as described in more detail below, the initial trigger may comprise a trigger that is automatically generated after a previous initial trigger was followed by an unsuccessful attempt to obtain a calibration location estimate.

At decisional step 402, a determination is made regarding the status of a superframe in the ranging receiver 14. According to one embodiment, the superframe comprises 25 frames, each of which further comprises five subframes. The superframe comprises 37,500 bits, which are transmitted from the satellites 12 at 50 bits per second. Each of the 25 frames comprises a 1500-bit message that includes timing, identification, and ephemeris data, along with portions of the constellation's almanac data and various telemetry, checksum, and counterwords for each satellite 12.

Changes in the message relating to updates to the ephemeris and almanac data occur at infrequent intervals, usually between four and 24 hours, and affect only a small portion of the message for each update. Therefore, if the superframe in the ranging receiver 14 is relatively current, the message in that superframe may be used by the ranging receiver 14.

If no superframe is present in the ranging receiver 14 or if the superframe is expired, the method follows the Expired branch from decisional step 402 to step 404. The superframe may be considered expired if the superframe is greater than 96 hours old. However, it will be understood that the superframe may be considered expired based on another suitable amount of time or other suitable criteria without departing from the scope of the present invention. At step 404, the ranging receiver 14 downloads the superframe from the satellites 12 or from the geolocation processor 24.

If the superframe in the ranging receiver 14 is not current, the method follows the Not Current branch from decisional step 402 to step 406. The superframe may be considered not current if the superframe is between 4 and 96 hours old. However, it will be understood that the superframe may be considered not current based on another suitable amount of time or other suitable criteria without departing from the scope of the present invention.

At step 406, the ranging receiver 14 downloads an update to the superframe from the satellites 12 or from the geolocation processor 24. Any data obtained from the geolocation processor 24 in steps 404 or 406 may be obtained over the voice channel using the modems 40 or via an alternate pathway using, for example, a control channel for the wireless carrier network 20 or other suitable data pathway.

Returning to decisional step 402, if the superframe in the ranging receiver 14 is current, the method follows the Current branch from decisional step 402 to decisional step 408. Also, after a superframe has been downloaded in step 404 or an update has been downloaded in step 406, the method continues to decisional step 408. The superframe may be considered current if the superframe is less than 4 hours old. However, it will be understood that the superframe may be considered current based on another suitable amount of time or other suitable criteria without departing from the scope of the present invention.

At decisional step 408, a determination is made regarding whether or not a fresh calibration location estimate is available. According to one embodiment, a fresh calibration location estimate comprises a location estimate that has been performed within the past ten minutes. However, it will be understood that a calibration location estimate may be considered fresh after any suitable period of time or based on other suitable criteria without departing from the scope of the present invention.

If no fresh calibration location estimate is available, the method follows the No branch from decisional step 408 to step 410. At step 410, the location circuitry of the ranging receiver 14 is turned on. Thus, for example, the power management circuitry 230 may provide full power to each of the components 204, 206, 208, 210, 212, 214, 216, 218, 220 and 222. At step 412, the ranging receiver 14 begins collecting samples for CFO extraction and attempts to perform CFO extraction based on the collected samples.

At decisional step 414, a determination is made regarding whether or not the CFO extraction was successful. If the CFO extraction was successful, the method follows the Yes branch from decisional step 414 to step 416. At step 416, the ranging receiver 14 enters a stand-alone mode for pseudorange estimation. At step 418, the ranging receiver 14 estimates pseudorange. According to one embodiment, the ranging receiver 14 estimates pseudorange in accordance with the method of FIGS. 7 and 8.

At decisional step 420, a determination is made regarding whether or not the real-time clock 232 has the current time. If the real-time clock 232 does not have the current time, the method follows the No branch from decisional step 420 to step 422.

At step 422, the real-time clock 232 for the ranging receiver 14 is calibrated, or synchronized, to a standardized time of day (TOD), such as GPS time, across the wireless link or to the TOD information received in the positioning signals. Once calibrated, the real-time clock 232 keeps track of real time so that the timing of events in the ranging receiver 14, such as message data bit transition times, can be accurately tracked. From step 422, the method continues to step 424.

Returning to decisional step 420, if the real-time clock 232 has the current time, the method follows the Yes branch from decisional step 420 to step 424. At step 424, the ranging receiver 14 performs a calibration location estimate.

At step 426, the ranging receiver 14 determines its receiver bias based on geometric and measured data. The geometric data may comprise satellite message data, approximate location data and/or other suitable data useful for estimating Doppler frequency shift. The approximate location data may comprise a previous location estimate, such as a calibration location estimate, or general location information provided by an external source, such as a cell site identification provided by a PSAP or an estimate provided by a user of the wireless device 16. According to one embodiment, the ranging receiver 14 determines its receiver bias by first determining the actual Doppler frequency shift for the satellite signals being processed based on the geometric data from each satellite 12. Based on the actual Doppler frequency shifts (estimated from the geometric data) and the measured CFOs, the ranging receiver 14 calculates the receiver frequency bias for the ranging receiver 14, which is stored for future use. At step 428, the ranging receiver 14 reverts to the low-power standby condition and waits for another trigger.

At step 430, the ranging receiver 14 sets a timer for a recalibration trigger. Thus, after the timer expires, a recalibration trigger will be generated in step 434 to prompt the ranging receiver 14 to perform another location estimate. The method then returns to step 430 where the timer is reset for another recalibration trigger. In this way, the location estimate may be automatically updated periodically.

According to one embodiment, the timer set in step 430 expires after approximately 10 minutes. However, it will be understood that the timer may expire after any suitable amount of time without departing from the scope of the present invention. For example, according to one embodiment, the timer may expire after a varying amount of time based on comparing consecutive location estimates. Thus, for this embodiment, the timer may expire after a reduced amount of time when consecutive location estimates indicate that the ranging receiver 14 is moving at greater than a certain velocity and may expire after an increased amount of time when consecutive location estimates indicate that the ranging receiver 14 is moving at less than a certain velocity.

Returning to decisional step 414, if the CFO extraction was not successful, the method follows the No branch from decisional step 414 to step 440. At step 440, the ranging receiver 14 sets a timer for an initial trigger. Thus, after a specified amount of time has passed (i.e., after the timer expires), an initial trigger will be generated in step 442. The method then returns to step 400 where the ranging receiver 14 detects the initial trigger and the method begins again. In this way, the calibration location estimate may be re-attempted automatically at a later time. According to one embodiment, the specified amount of time is approximately 10 minutes. However, it will be understood that the specified amount of time may be any suitable length of time without departing from the scope of the present invention.

Returning to decisional step 408, if a fresh calibration location estimate is determined to be available, the method follows the Yes branch from decisional step 408 to step 430 where the timer is set for a recalibration trigger as described above. In this way, the calibration location estimate may be updated automatically after the specified period of time.

Figure 5:
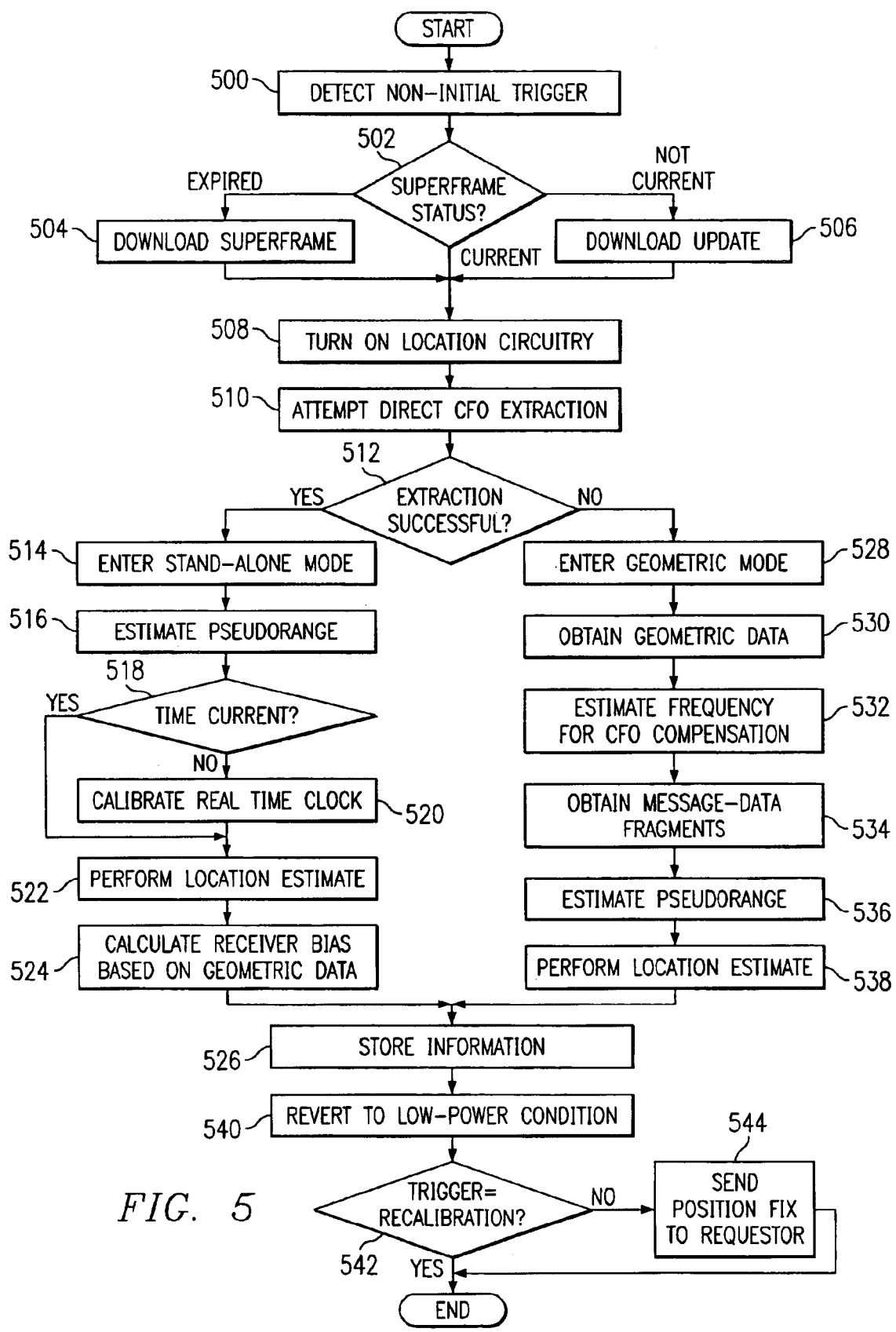
FIG. 5 is a flow diagram illustrating a method for obtaining a location estimate based on a non-initial trigger for the ranging receiver of FIG. 1, 2 or 3 in accordance with one embodiment of the present invention.

FIG. 5 is a flow diagram illustrating a method for obtaining a location estimate based on a non-initial trigger for the ranging receiver 14 in accordance with one embodiment of the present invention. The method begins at step 500 where the ranging receiver 14 detects a non-initial trigger.

According to one embodiment, the non-initial trigger may comprise a recalibration trigger that is automatically generated by the ranging receiver 14 periodically based on a timer. Thus, when the recalibration trigger is generated, the timer for the recalibration trigger may be automatically reset to trigger another location estimate after a specified amount of time has passed. The non-initial trigger may also comprise a trigger that is generated by a user of the wireless device 16 pushing a button 30 on the ranging receiver 14, generated by a service requester 62, or based on any other suitable request.

At decisional step 502, a determination is made regarding the status of a superframe in the ranging receiver 14. If no superframe is present in the ranging receiver 14 or if the superframe is expired, the method follows the Expired branch from decisional step 502 to step 504. The superframe may be considered expired if the superframe is greater than 96 hours old. However, it will be understood that the superframe may be considered expired based on another suitable amount of time or other suitable criteria without departing from the scope of the present invention. At step 504, the ranging receiver 14 downloads the superframe from the satellites 12 or from the geolocation processor 24.

If the superframe in the ranging receiver 14 is not current, the method follows the Not Current branch from decisional step 502 to step 506. The superframe may be considered not current if the superframe is between 4 and 96 hours old. However, it will be understood that the superframe may be considered not current based on another suitable amount of time or other suitable criteria without departing from the scope of the present invention. At step 506, the ranging receiver 14 downloads an update to the superframe from the satellites 12 or from the geolocation processor 24.

Any data obtained from the geolocation processor 24 in steps 504 or 506 may be obtained over the voice channel using the modems 40 or via an alternate pathway using, for example, a control channel for the wireless carrier network 20 or other suitable data pathway.

Returning to decisional step 502, if the superframe in the ranging receiver 14 is current, the method follows the Current branch from decisional step 502 to step 508. Also, after a superframe has been downloaded in step 504 or an update has been downloaded in step 506, the method continues to step 508. The superframe may be considered current if the superframe is less than 4 hours old. However, it will be understood that the superframe may be considered current based on another suitable amount of time or other suitable criteria without departing from the scope of the present invention.

At step 508, the location circuitry of the ranging receiver 14 is turned on. At step 510, the ranging receiver 14 begins collecting samples for CFO extraction and attempts to perform CFO extraction based on the collected samples.

At decisional step 512, a determination is made regarding whether or not the CFO extraction was successful. If the CFO extraction was successful, the method follows the Yes branch from decisional step 512 to step 514. At step 514, the ranging receiver enters the stand-alone mode for pseudorange estimation. At step 516, the ranging receiver 14 estimates pseudorange. According to one embodiment, the ranging receiver 14 estimates pseudorange in accordance with the method of FIGS. 7 and 8.

At decisional step 518, a determination is made regarding whether or not the real-time clock 232 has the current time. If the real-time clock 232 does not have the current time, the method follows the No branch from decisional step 518 to step 520.

At step 520, the real-time clock 232 for the ranging receiver 14 is calibrated, or synchronized, to a remote clock across the wireless link or based on TOD information in the positioning signals. Once calibrated, the real-time clock 232 keeps track of real time so that the timing of events in the ranging receiver 14, such as message bit transition times, can be accurately tracked. From step 520, the method continues to step 522.

Returning to decisional step 518, if the real-time clock 232 has the current time, the method follows the Yes branch from decisional step 518 to step 522. At step 522, the ranging receiver 14 performs the location estimate.

At step 524, the ranging receiver 14 determines its receiver bias based on geometric data. The geometric data may comprise satellite message data, approximate location data and/or other suitable data useful for estimating CFO for compensation during pseudorange processing in the geometric mode. The approximate location data may comprise a previous location estimate, such as a calibration location estimate, or general location information provided by an external source, such as a cell site identification provided by a PSAP or an estimate provided by a user of the wireless device 16. According to one embodiment, the ranging receiver 14 determines its receiver bias by first calculating the actual Doppler frequency shift for each of the satellite signals being received based on the geometric data for each satellite 12 and the most recent location estimate. Based on these actual Doppler frequency shifts, the ranging receiver 14 calculates the difference between the actual measured CFOs and the calculated Doppler frequency shifts to determine the frequency bias for the ranging receiver 14, which is stored for future use. From step 524, the method continues to step 526.

Returning to decisional step 512, if the CFO extraction was not successful, the method follows the No branch from decisional step 512 to step 528. At step 528, the ranging receiver 14 enters the geometric mode. Thus, when the ranging receiver 14 can successfully perform CFO extraction, the ranging receiver 14 enters the stand-alone mode in order to determine a pseudorange. However, when the ranging receiver 14 is unable to perform CFO extraction due to the weak level of the signals being received at the ranging receiver 14, the ranging receiver 14 enters the geometric mode in order to determine a pseudorange. According to one embodiment, the ranging receiver 14 enters the geometric mode if attempted CFO extraction is unsuccessful within a pre-defined period of time. Depending on the application or embodiment, the pre-defined period of time may comprise approximately 1 to 30 seconds or any other suitable period of time.

At step 530, the ranging receiver 14 obtains geometric data for the location estimating process. As used herein "to obtain data" means to retrieve or receive data from a local memory store or from a remote device. According to one embodiment, the geometric data comprises satellite message data and approximate location data. The approximate location data may comprise a previous location estimate, such as a calibration location estimate, or general location information provided by an external source, such as a cell site identification provided by a PSAP or an estimate provided by a user of the wireless device 16.

At step 532, the ranging receiver 14 estimates the CFO for each satellite 12. According to one embodiment, these CFOs are estimated by summing the Doppler frequency shifts (which may be determined based on the geometric data) and the receiver frequency bias (which was previously determined during the calibration process).

Figure 12:
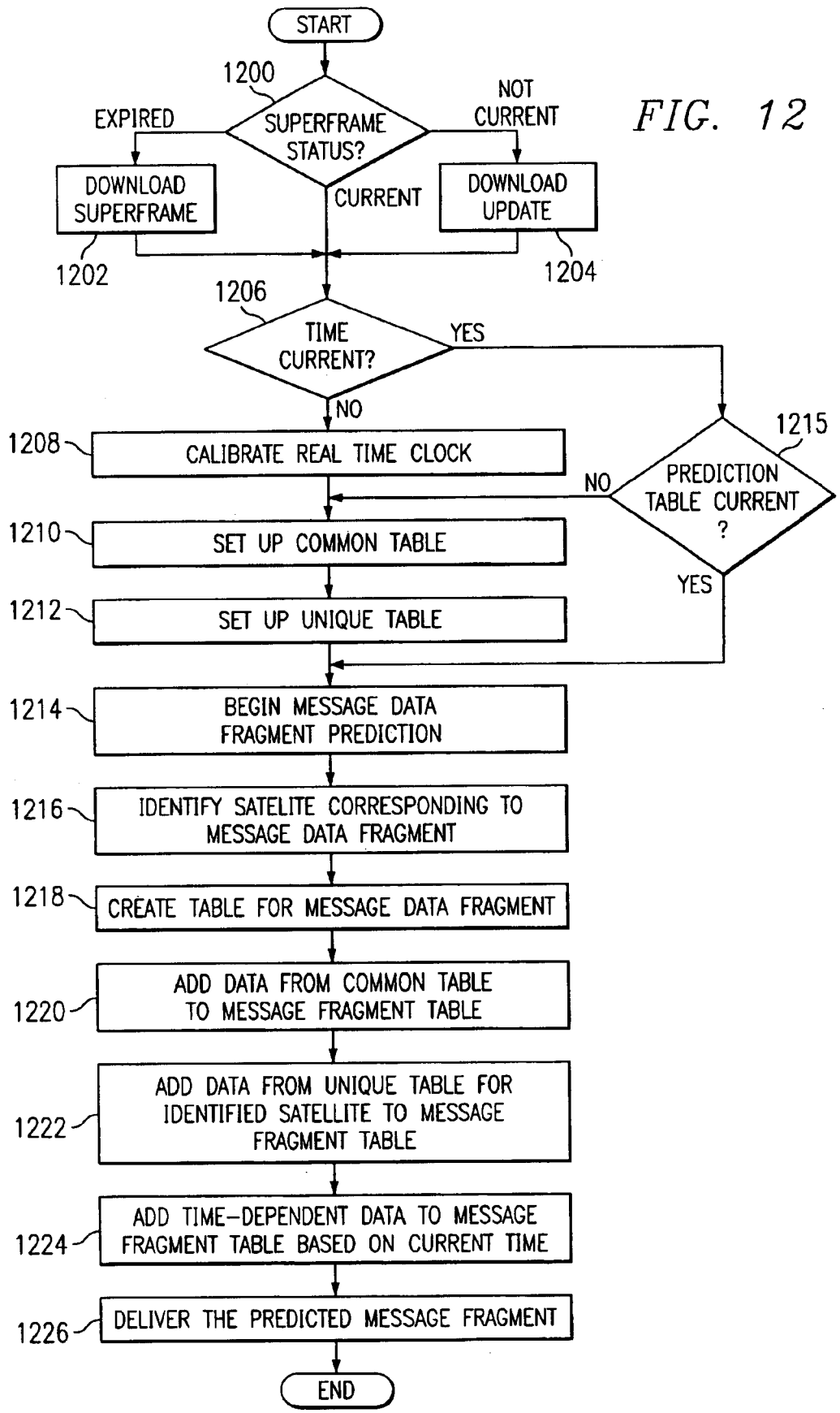
FIG. 12 is a flow diagram illustrating a method for predicting satellite message data received in positioning signals at the ranging receiver of FIGS. 1, 2 or 3 in accordance with one embodiment of the present invention.

At step 534, the ranging receiver 14 obtains message data fragments from the geolocation processor 24 or from the results of the method for predicting satellite message data described in FIG. 12 or other suitable prediction method. At step 536, the ranging receiver 14 estimates pseudorange. According to one embodiment, the ranging receiver 14 estimates pseudorange in accordance with the method of FIGS. 13A, 13B and 13C. At step 538, the ranging receiver 14 performs the location estimate.

From steps 524 and 538, the method continues to step 526 where the ranging receiver 14 stores the location estimate, receiver bias and current time. At step 540, the ranging receiver 14 reverts to the low-power standby condition. At decisional step 542, a determination is made regarding whether the trigger detected in step 500 was a recalibration trigger. If the trigger was not a recalibration trigger, the method follows the No branch from decisional step 542 to step 544. At step 544, the ranging receiver 14 sends the location estimate to the requester who generated the trigger, at which point the method comes to an end. However, if the trigger was determined to be a recalibration trigger in decisional step 542, the method follows the Yes branch from decisional step 542 and comes to an end.

Figure 6B:
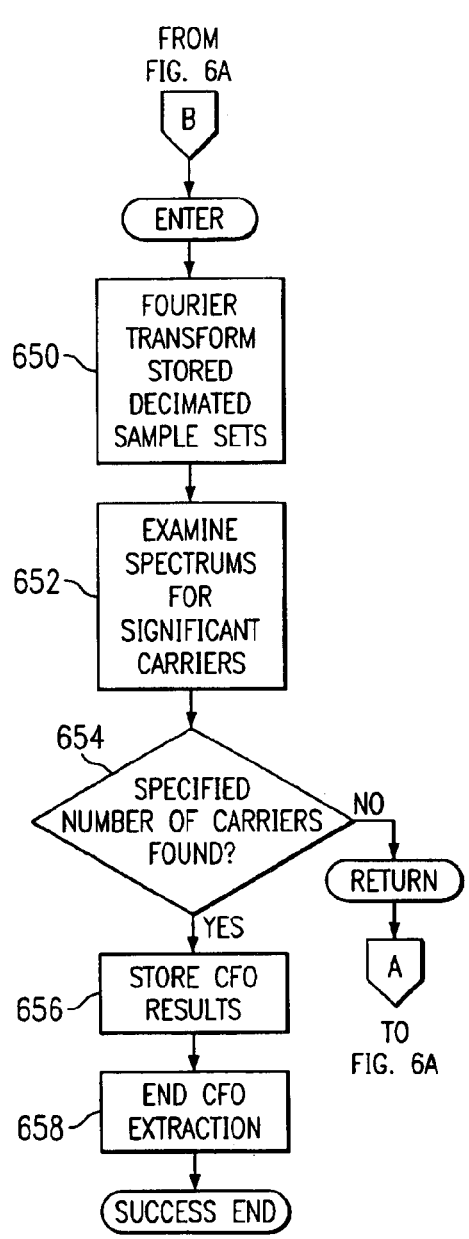

FIGS. 6A and 6B are flow diagrams illustrating a method for direct CFO extraction in the system 10 in accordance with one embodiment of the present invention. The method begins at step 600 where the location circuitry of the ranging receiver 14 is turned on. At step 602, a decimated output matrix, DM, of dimension (P,W) with element pointer p,w, is initialized and the decimated output pointer, p, is initialized to 1.

At step 604, sample sizes S1 and S2 are initialized, a maximum number of samples, MAX, is initialized to S1, and a sample number, s, is set to 1. Also at step 604, a rate correction indicator, RC, is set to 0. In one embodiment, the sample size S1 is set to correspond to a sampled duration of approximately one second and the sample size S2 is set to correspond to a sampled duration between approximately 5 and 100 seconds. However, it will be understood that the sample sizes may be set to any suitable number without departing from the scope of the present invention.

At step 606, a number W of rate values, $R_w$, is initialized and w is set to a value of one. In one embodiment, the number of values is selected to ensure that the error range between values is less than 0.1 Hz/second. The number of values may be selected as the maximum rate range divided by the error range. According to one embodiment, the maximum rate range may reach approximately 1.0 Hz/second and the number of values may be selected to be 1/(0.1--0.1), or 5. It will be understood, however, that any suitable criteria may be used in selecting the number of values.

At step 608, a decimation counter is initialized. According to one embodiment, the decimation counter is initialized to a decimation rate, DR, that corresponds to the rate at which the samples will be decimated. This decimation rate may be chosen in relation to the signal-sampling rate (which may be 1,024 kHz×$2^n$, with n=1, 2 or 3, or other suitable rate). For example, the signal may be sampled directly to result in down-conversion to baseband at these sampling rates or at higher rates to produce results that may be easily converted to I/Q samples. According to one embodiment, the decimation rate may be chosen to yield a signal with at least a 20 kHz bandwidth, thereby allowing for the maximum range of the CFOs and the doubling in frequency caused by the squaring step. Thus, for a 2,048 kHz complex sampling rate (n=1, above), the decimation rate (DR) may be chosen to be approximately 100.

At step 610, the ranging receiver 14 collects a new signal sample. At step 611, the ranging receiver 14 increments the sample counter, s. At step 612, the ranging receiver 14 squares the signal sample in order to recover the original carrier on which the biphase Gold code is modulated and to double its original frequency. At step 614, the ranging receiver 14 adds the squared sample value to an accumulator. According to one embodiment, the squared sample is multiplied by a filtering coefficient identified by the decimation counter before being added to the accumulator. At step 616, the ranging receiver 14 decrements the decimation counter.

At decisional step 618, a determination is made regarding whether or not the decimation counter is equal to zero. If the decimation counter is not equal to zero, the method follows the No branch from decisional step 618 and returns to step 610 for the collection of another signal sample. However, if the decimation counter is equal to zero, the method follows the Yes branch from decisional step 618 to decisional step 620.

At decisional step 620, a determination is made regarding whether or not RC equals 1. According to the illustrated embodiment, rate correction is applied when RC equals 1 and is not applied when RC equals 0. However, it will be understood that rate correction may be applied based on any suitable vales for RC or based on other suitable criteria without departing from the scope of the present invention. For the illustrated embodiment, if RC equals 1, the method follows the Yes branch from decisional step 620 to step 621. At step 621, w is set to a value of one.

At step 622, the ranging receiver 14 gets the $w^{th}$ Doppler correction. In order to determine the $w^{th}$ Doppler correction, the ranging receiver 14 computes a pointer to a table of sine and cosine values. These tabular values are used to implement multiplication of the samples by the phase rotation vector $e^{-j\omega t}$, i.e., $\cos(\omega t)-j\cdot\sin(\omega t)$, where j represents the square root of −1 and ω is the frequency term $2\pi(D_w+R_w t)$, where $D_w$ is the current, or $w^{th}$, Doppler frequency shift and $R_w$ is the current, or $w^{th}$, Doppler rate. Since $D_w$ is unknown, it is set to zero, and since the estimate producing the largest response will identify the appropriate rate $R_w$, $D_w$ will come out of the spectral analysis of each of the W rate-compensated arrays as the CFO. The variable t is the time from the beginning of the analysis to the center of the current decimated sample, i.e., $t=i/f_{sample-rate}$, and i=signal sample number at the center of this decimated sample.

At step 624, the ranging receiver 14 complex multiplies the complex decimated sample (I/Q sampling) accumulated at step 614 by the $w^{th}$ complex Doppler correction. At step 626, the ranging receiver 14 stores the results of the complex multiplication at a location identified by p,w in the decimated output matrix in the signal sample memory 216. At step 628, the ranging receiver 14 increments w.

At decisional step 630, a determination is made regarding whether or not w is greater than W. If w is not greater than W, the method follows the No branch from decisional step 630 and returns to step 622, where the ranging receiver 14 gets the Doppler correction for the incremented w. However, if w is greater than W, the method follows the Yes branch from decisional step 630 to step 632. At step 632, the ranging receiver 14 increments p.

Returning to decisional step 620, if RC does not equal 1, the method follows the No branch from decisional step 620 to step 634. At step 634, the value in the accumulator described in step 614 is stored at a location identified by p,w in the signal sample memory 216. At this point, the method continues to step 632 where the ranging receiver 14 increments p. From step 632, the method continues to decisional step 635.

At decisional step 635, a determination is made regarding whether or not p is equal to the maximum number of decimated samples, MAX/DR. If p is not equal to MAX/DR, the method follows the No branch from decisional step 635 and returns to step 608 where the decimation counter is re-initialized for the process of collecting additional signal samples. However, if p is equal to MAX/DR, the method follows the Yes branch from decisional step 635 to step 636.

At step 636, the ranging receiver 14 attempts to find significant carriers in the sample sets. According to one embodiment, the ranging receiver 14 attempts to find significant carriers in accordance with the method of FIG. 6B. While the ranging receiver is attempting to find significant carriers, the method continues to decisional step 640.

At decisional step 640, a determination is made regarding whether or not s is greater than MAX. If s is not greater than MAX, the method follows the No branch from decisional step 640 and returns to step 608 where the decimation counter is re-initialized. However, if s is greater than MAX, the method follows the Yes branch from decisional step 640 to step 642. At step 642, RC is set to a value of one, and MAX is increased from S1 to the greater value S2.

At decisional step 644, a determination is made regarding whether or not s is greater than MAX. If s is not greater than MAX, the method follows the No branch from decisional step 644 and returns to step 608 where the decimation counter is re-initialized. However, if s is greater than S2, the method follows the Yes branch from decisional step 644 to step 646. At step 646, a flag is set to indicate that the signal is too weak for successful CFO extraction, at which point the method comes to an end.

FIG. 6B is a flow diagram illustrating a method for attempting to find significant carriers in the method of FIG. 6A in accordance with one embodiment of the present invention. The method begins at step 650 where the decimated sample sets stored in the signal sample memory 216, each of which corresponds to a Doppler-rate compensation estimate, are Fourier-transformed into the frequency domain.

At step 652, the spectrum of each set is searched for significant carriers, i.e., carriers that are sufficiently above a noise-background threshold. According to one embodiment, a carrier is sufficiently above the noise-background threshold when the carrier is at least 6 dB above the noise-background threshold. However, it will be understood that a carrier may be sufficiently above the noise-background threshold when the carrier is any suitable level above the noise-background threshold.

In a particular embodiment, the six highest peaks are identified as possible carriers and the 20 next highest peaks are averaged to establish a noise-background threshold. The possible carriers may be confirmed as carriers that are sufficiently above the noise-background threshold when the carriers are at least four times, or the equivalent of 6 dB, higher than the threshold. It will be understood that the noise-background threshold may be otherwise suitably determined without departing from the scope of the present invention. In addition, the carriers may be considered to be sufficiently above the noise-background threshold when the carriers are at any suitable level above the threshold.

At decisional step 654, a determination is made regarding whether a specified minimum number of significant carriers sufficiently above the noise-background threshold has been found. According to one embodiment, the specified minimum number is four. According to another embodiment, the specified minimum number may be greater than four since the availability of more pseudorange estimates improves the quality or confidence level of a location estimate. However, it will be understood that any suitable number of significant carriers may be specified.

If the specified number of significant carriers has been found, the method follows the Yes branch from decisional step 654 to step 656. At step 656, the ranging receiver 14 stores the CFO results. At step 658, the direct CFO extraction of the method of FIG. 6A is ended due to the successful attempt to find significant carriers. In this way, CFOs can be extracted from approximately one second of signal sample processing from signals obstructed up to approximately 10 dB of attenuation or can be extracted from approximately 10 seconds of signal sample processing from signals obstructed up to approximately 15 dB of attenuation.

Returning to decisional step 654, if the specified number of significant carriers has not been found, the method follows the No branch from decisional step 654 and returns to the method of FIG. 6A for the continuation of direct CFO extraction.

Figure 7:
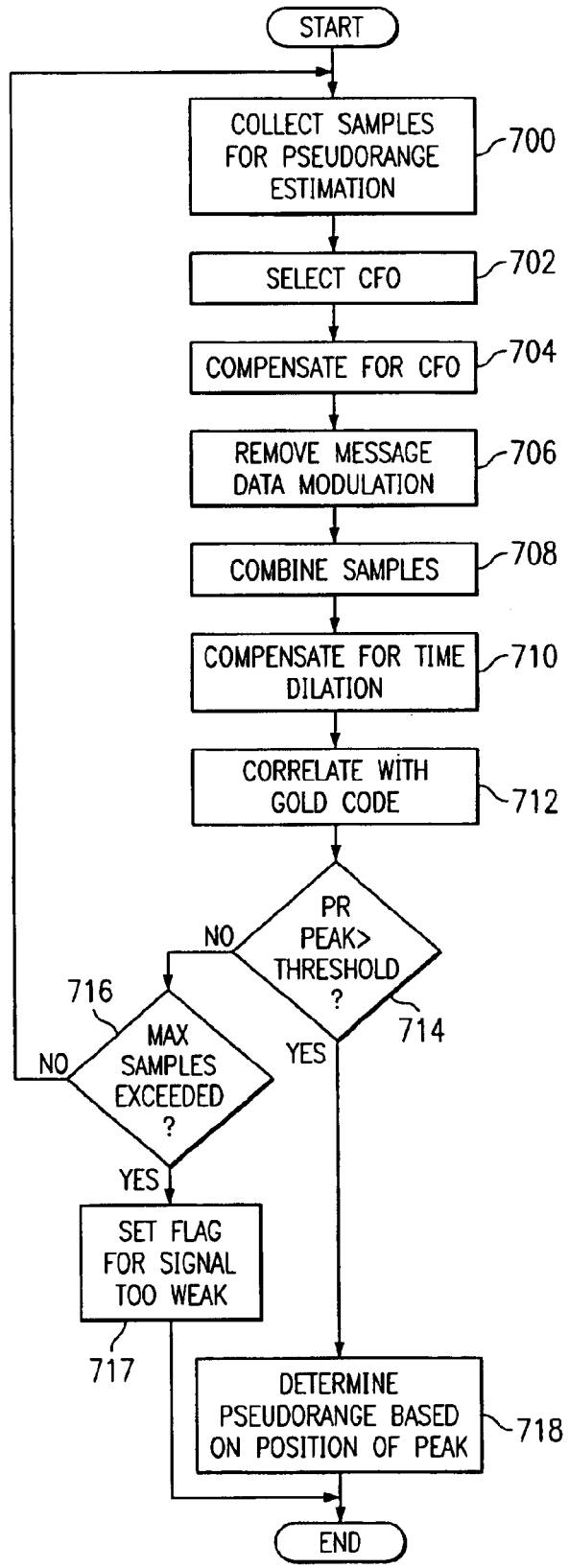
FIG. 7 is a flow diagram illustrating a method for determining pseudorange in the ranging receiver of FIGS. 1, 2 or 3 in a stand-alone mode in accordance with one embodiment of the present invention.

FIG. 7 is a flow diagram illustrating a method for determining a pseudorange in the ranging receiver 14 in the stand-alone mode in accordance with one embodiment of the present invention. The method begins at step 700 where the ranging receiver 14 begins to collect samples for pseudorange estimation from the signals received from the satellites 12. At step 702, the ranging receiver 14 selects one of the CFOs determined from the direct CFO extraction process of FIG. 6 for the satellites 12. At step 704, the ranging receiver 14 begins to process the pseudorange samples by compensating the samples for the selected CFO. As used herein, "pseudorange samples" means signal samples from which pseudorange may be estimated.

At step 706, the ranging receiver 1 removes satellite message data modulation from the pseudorange samples by multiplying out the biphase message data modulation, as described in more detail below in connection with FIGS. 8A and 8B.

At step 708, the ranging receiver 14 linearly combines, or stacks, the samples into a single epoch duration result for each satellite 12. At step 710, the ranging receiver 14 compensates for time dilation. At step 712, the ranging receiver 14 correlates the Gold codes for the satellites 12 to give the pseudoranges from those satellites 12. According to one embodiment, the ranging receiver 14 correlates the Gold codes by Fourier transform means. For this embodiment, each CFO-compensated stack of samples which has been Fourier-transformed is multiplied by the Fourier transform of the time-reversed series of the Gold code for a satellite 12 (sampled at the same rate as the pseudorange samples and stored in memory 216 or 220). The product is then inverse-Fourier transformed to yield the pseudorange time sequence.

At decisional step 714, a determination is made regarding whether a correlation peak exists in each of the pseudorange time sequences that is sufficiently above a noise-background threshold. According to one embodiment, a correlation peak is sufficiently above the noise-background threshold when the correlation peak is at least 6 dB above the noise-background threshold. However, it will be understood that a correlation peak may be sufficiently above the noise-background threshold when the correlation peak is any suitable level above the noise-background threshold. If such a peak does not exist for any of the pseudorange time sequences, the method follows the No branch from decisional step 714 to decisional step 716.

At decisional step 716, a determination is made regarding whether a maximum number of combined pseudorange samples has been exceeded for the pseudorange time sequences without a correlation peak. According to various embodiments, the maximum number of combined samples is based on a corresponding amount of sampling time for a location estimate that is approximately 1 to 30 seconds. However, it will be understood that the maximum number of combined samples may be any suitable number.

If the maximum number of combined pseudorange samples has been exceeded, this indicates that the corresponding pseudorange signals being received at the ranging receiver 14 are too weak to be used. In this situation, the method follows the Yes branch from decisional step 716 to step 717 where a flag is set to indicate that the signal is too weak, at which point the method comes to an end. However, if the maximum number of combined pseudorange samples has not been exceeded, the method follows the No branch from decisional step 716 and returns to step 700 to process more samples to be combined with previously compensated and stacked samples for pseudorange estimation.

Returning to decisional step 714, if a correlation peak that is sufficiently above the noise-background threshold does exist for each of the pseudorange time sequences, the method follows the Yes branch from decisional step 714 to step 718. At step 718, a pseudorange is determined based on the correlation peak, after which the method comes to an end. According to one embodiment, a multi-path correcting centroid calculation is applied to determine a substantially exact location of the center of each of the peaks based on techniques that compensate for the distortion of each peak's shape by the presence of multi-path signals occurring near the correlation peak. In this way, a useable pseudorange may be determined based on approximately 0.1 seconds worth of received signal samples comprising a minimum carrier-to-noise density ratio of approximately 20 dB.

Figure 8A:
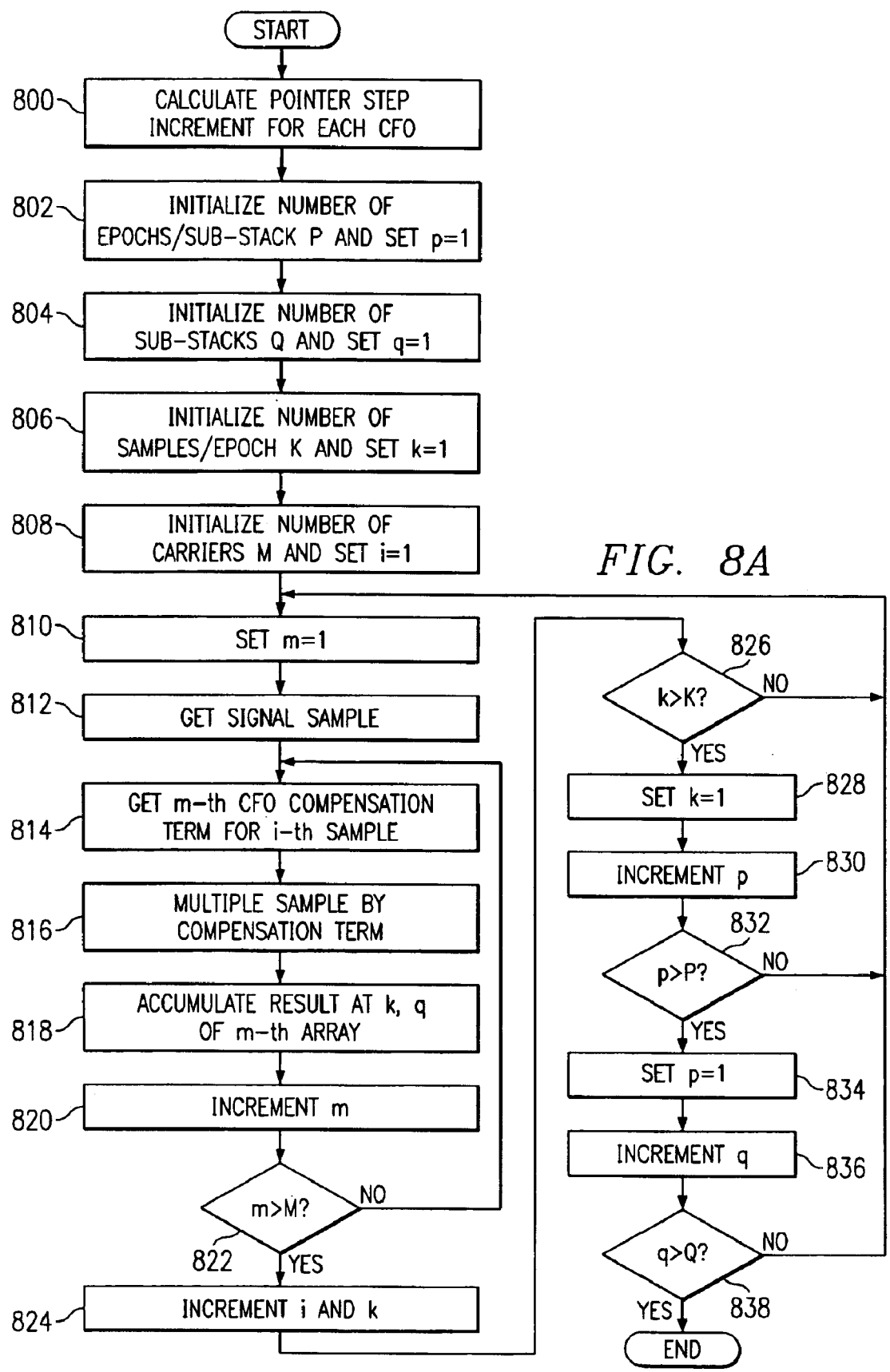

FIGS. 8A and 8B are flow diagrams illustrating a method for aligning message data to determine a pseudorange in the ranging receiver 14 in a stand-alone mode in accordance with one embodiment of the present invention. The method of FIG. 8A begins with the availability of a specified number of identified significant carriers, each having a CFO. According to one embodiment, the carriers are identified through the direct CFO extraction process described above in connection with FIGS. 6A and 6B.

For each of the CFOs, a pointer-step increment, g(m), is generated at step 800. This pointer-step increment is used to increment a pointer that indexes a table of sine and cosine trigonometric values to be used for frequency compensation by complex-vector rotation. The magnitude of the increment is proportional to the frequency to be compensated. In one embodiment, by using the moduli and signs of the pointer value, the table can be restricted to one quadrant of values.

At step 802, a number of epochs per sub-stack, P, is initialized and its counter, p, is set to a value of one. According to one embodiment, P is initialized to a value of four or five. At step 804, a number of sub-stacks per analysis, Q, is initialized and its counter, q, is set to a value of one. According to one embodiment n is initialized to a value of 60/P, or twelve for the embodiment in which P is initialized to a value of five.

At step 806, a number of samples per epoch, K, is initialized, and a samples per epoch counter, k, is set to a value of one. According to one embodiment, K is initialized to a value of $1,023 \times 2^n$, with n=1, 2 or 3. At step 808, a number of carriers, M, is initialized and a signal sample counter, i, is set to a value of one. According to one embodiment, M is initialized to a value of four, five, or six, based on the specified number of significant carriers available, as described above. At step 810, a carrier counter, m, is set to a value of one.

At step 812, the ranging receiver 14 gets a signal sample. At step 814, the ranging receiver 14 gets the $m^{th}$ CFO compensation term for the $i^{th}$ sample. In one embodiment, the $i^{th}$ pointer value for the $m^{th}$ CFO is n=modulo[g(m) i], where the modulus is equal to the number of entries in the trigonometric table that represent the interval 0 to 90 degrees of rotation. The sine and cosine values at this pointer value are fetched from the table to form the complex rotational compensation vector w=cosine [n]+j sine [n], where j represents the square root of −1. At step 816, the ranging receiver 14 complex multiplies the sample by the CFO compensation term. At step 818, the ranging receiver 14 accumulates the result of the complex multiplication at a location identified by k,q (i.e., position k in sub-stack q) in an $m^{th}$ array. At step 820, the ranging receiver 14 increments m.

At decisional step 822, a determination is made regarding whether or not m is greater than M. If m is not greater than M, the method follows the No branch from decisional step 822 and returns to step 814. However, if m is greater than M, the method follows the Yes branch from decisional step 822 to step 824. At step 824, the ranging receiver 14 increments both k and i.

At decisional step 826, a determination is made regarding whether or not k is greater than K. If k is not greater than K, the method follows the No branch from decisional step 826 and returns to step 810 where m is set to a value of one before another signal sample is collected. However, if k is greater than K, the method follows the Yes branch from decisional step 826 to step 828. At step 828, k is set to a value of one. At step 830, the ranging receiver 14 increments p.

At decisional step 832, a determination is made regarding whether or not p is greater than P. If p is not greater than P, the method follows the No branch from decisional step 832 and returns to step 810 where m is set to a value of one before another signal sample is collected. However, if p is greater than P, the method follows the Yes branch from decisional step 832 to step 834. At step 834, p is set to a value of one. At step 836, the ranging receiver 14 increments q.

At decisional step 838, a determination is made regarding whether or not q is greater than Q. If q is not greater than Q, the method follows the No branch from decisional step 838 and returns to step 810 where m is set to a value of one before another signal sample is collected. However, if q is greater than Q, the method follows the Yes branch from decisional step 838 and comes to an end. At this point, sub-stacks have been generated for use in determining message data alignment, as described in more detail below and in connection with FIGS. 9, 10 and 11.

The method of FIG. 8B begins at step 844 where the ranging receiver 14 sets k, p, q and a sub-stacks per bit counter, r, all to a value of one and initializes a number of sub-stacks per data bit, R. According to one embodiment, R is initialized to a value of 20/P. At step 846, the ranging receiver 14 sets m to a value of one. At step 848, the ranging receiver 14 adds the value at the location identified by k,q of the $m^{th}$ array to the value at the location identified by k,r of the $m^{th}$ array. At step 850, the ranging receiver 14 adds the value at the location identified by k,q+R of the $m^{th}$ array to the value at the location identified by k,r+R of the $m^{th}$ array. At step 852, the ranging receiver 14 increments m.

At decisional step 854, a determination is made regarding whether or not m is greater than M. If m is not greater than M, the method follows the No branch from decisional step 854 and returns to step 848 to add the values at the incremented $m^{th}$ array. However, if m is greater than M, the method follows the Yes branch from decisional step 854 to step 856. At step 856, the ranging receiver 14 increments k.

At decisional step 858, a determination is made regarding whether or not k is greater than K. If k is not greater than K, the method follows the No branch from decisional step 858 and returns to step 846 where m is set to a value of one. However, if k is greater than K, the method follows the Yes branch from decisional step 858 to step 860. At step 860, the ranging receiver 14 sets k to a value of one. At step 862, the ranging receiver 14 increments p.

At decisional step 864, a determination is made regarding whether or not p is greater than P. If p is not greater than P, the method follows the No branch from decisional step 864 and returns to step 846 where m is set to a value of one. However, if p is greater than P, the method follows the Yes branch from decisional step 864 to step 866. At step 866, the ranging receiver 14 sets p to a value of one. At step 868, the ranging receiver 14 increments r.

At decisional step 870, a determination is made regarding whether or not r is greater than R. If r is not greater than R, the method follows the No branch from decisional step 870 and returns to step 846 where m is set to a value of one. However, if r is greater than R, the method follows the Yes branch from decisional step 870 to step 872. At step 872, the ranging receiver 14 sets both r and k to a value of one. At step 874, the ranging receiver 14 sets m to a value of one.

At step 876, the ranging receiver 14 adds the value at the location identified by k,r of the $m^{th}$ array to the value at the location identified by k,r of an $m^{th}$ sum stack and to the value at the location identified by k,r+R of an $m^{th}$ difference stack.

At step 878, the ranging receiver 14 adds the value at the location identified by k,r+R of the $m^{th}$ array to the value at the location identified by k,r of the $m^{th}$ sum stack. At step 880, the ranging receiver 14 subtracts the value at the location identified by k,r+R of the $m^{th}$ array from the value at the location identified by k,r+R of the $m^{th}$ difference stack. At step 882, the ranging receiver 14 increments m.

At decisional step 884, a determination is made regarding whether or not m is greater than M. If m is not greater than M, the method follows the No branch from decisional step 884 and returns to step 874 where m is set to a value of one. However, if m is greater than M, the method follows the Yes branch from decisional step 884 to step 886. At step 886, the ranging receiver 14 increments k.

At decisional step 888, a determination is made regarding whether or not k is greater than K. If k is not greater than K, the method follows the No branch from decisional step 888 and returns to step 874 where m is set to a value 1. However, if k is greater than K, the method follows the Yes branch from decisional step 888 to step 890. At step 890, the ranging receiver 14 sets k to a value of one.

At step 892, the ranging receiver 14 correlates each sum stack (evaluating the same-signed data bits) and difference stack (evaluating the different-signed data bits) with the corresponding Gold codes to obtain pseudorange peaks and stores the peak values and their polarities in an output array at locations (m,r). At step 894, the ranging receiver 14 increments r.

At decisional step 896, a determination is made regarding whether or not r is greater than R. If r is not greater than R, the method follows the No branch from decisional step 896 and returns to step 874 where m is set to a value of one. However, if r is greater than R, the method follows the Yes branch from decisional step 896 to step 898. At step 898, the ranging receiver 14 evaluates the results of the pseudorange correlations stored in step 892 in order to determine the quality of the message data alignment obtained during the current iteration. Based on the maxima of the results, the ranging receiver 14 determines the alignment, and based on the sign of the maxima, the ranging receiver 14 determines the polarity of the corresponding message data bit. At this point, stacks have been generated and used to determine coarse message data alignment, as described in more detail below in connection with FIGS. 9A and 9B.

Figure 9B:
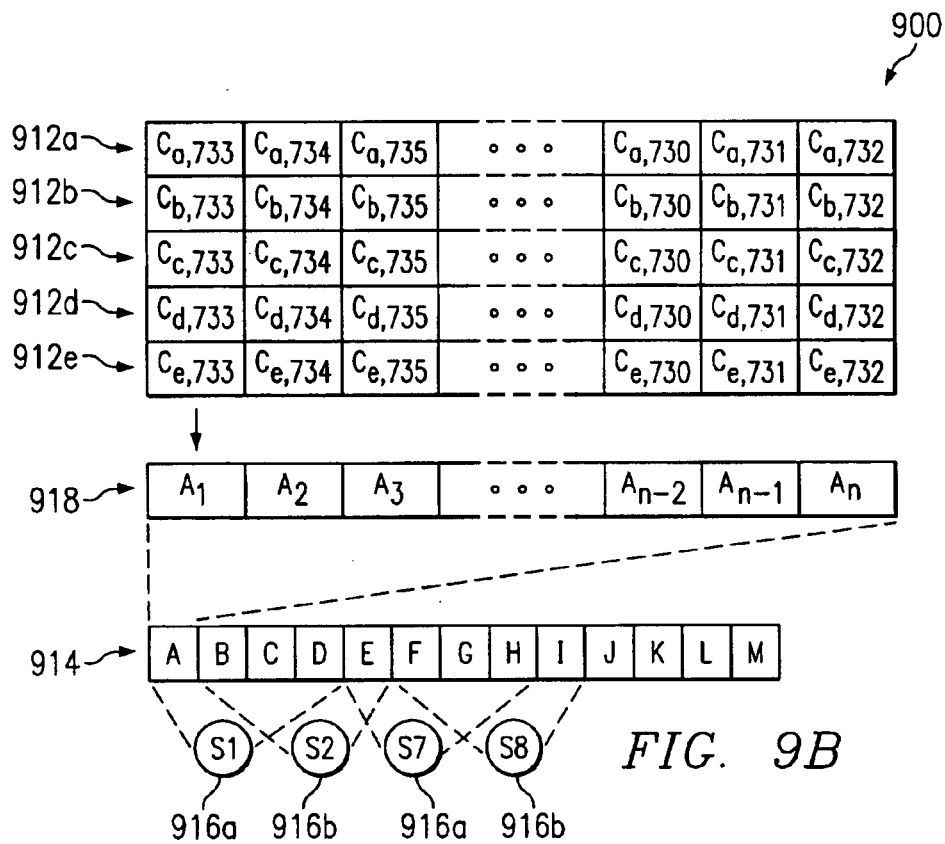
FIGS. 9A and 9B are block diagrams illustrating a system for generating sub-stacks and stacks to determine coarse satellite message data alignment in the system of FIG. 1 in accordance with one embodiment of the present invention.
Figure 9A:
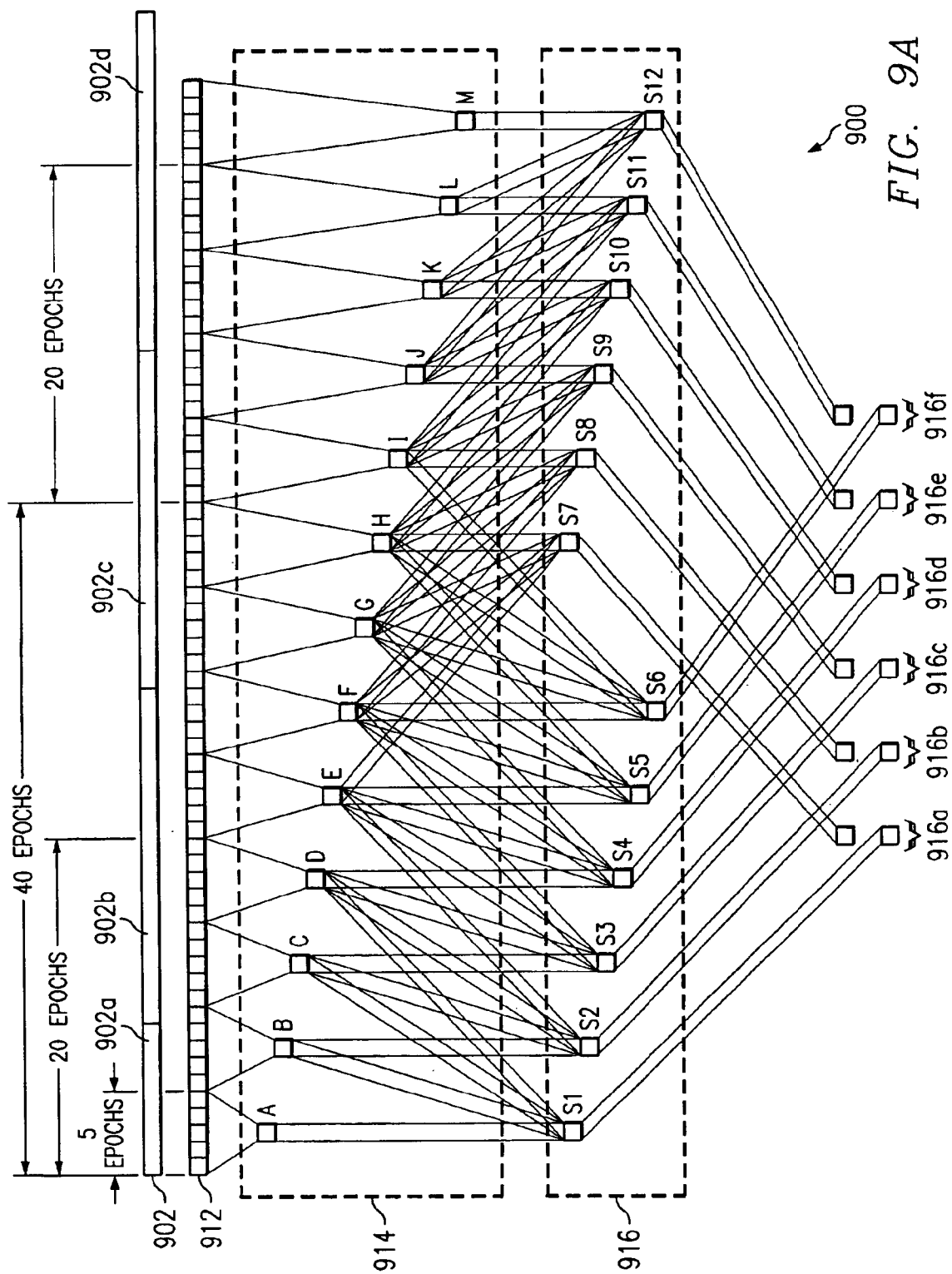

FIGS. 9A and 9B are block diagrams illustrating a system 900 for generating accumulated sub-stacks and stacks of CFO-compensated samples and for finding which of the alignments of those stacks with the message data bits produces the largest pseudorange estimates in accordance with one embodiment of the present invention. By determining alignment for the satellite message data, the ranging receiver 14 may remove the satellite navigation message data modulation from the received signal by inverting the signal (multiplying the received signal by negative one (−1)) where the bits of the satellite navigation message data modulation result in the Gold code modulation being inverted. Multiple, synchronous repetitions of the signals (i.e., code-epoch duration sets of signal samples) may then be added together to improve the signal-to-noise ratio. In this way, processing gain may be increased as compared to a signal that is squared in order to remove the satellite message data.

The system 900 comprises a data stream 902 that represents the signal being received at the ranging receiver 14 from the satellites 12. In the illustrated embodiment, each message data bit comprises 20 code epochs. For the illustrated example, a portion of a first message data bit 902a is followed by a second message data bit 902b, a third message data bit 902c and a fourth message data bit 902d. The data stream 902 comprises a plurality of epochs 912 that are received at the ranging receiver 14 from the satellites 12. In the illustrated embodiment, for GPS signals, there are 1,023 Gold-code chips in an epoch 912, which may be sampled at 2,048 or 4,096 samples per code epoch or other suitable sampling rate. Thus, each epoch 912 may include 2,048 signal samples for the first sampling rate.

To determine the satellite message data alignment in accordance with one embodiment of the present invention, the ranging receiver 14 combines a plurality of code-epoch duration sets of samples 912 into a plurality of sub-stacks 914. According to the illustrated embodiment, each sub-stack 914 comprises five code-epoch duration sample sets 912. The ranging receiver 14 then further combines the sub-stacks 914 into a plurality of stacks 916. According to the illustrated embodiment, each stack 916 comprises four sub-stacks 914. In an alternative embodiment, each sub-stack 914 could comprise four code epoch duration sample sets 912 and each stack 916 could comprise five sub-stacks 914. It will be understood that other suitable numbers of code-epochs duration sample sets 912 may be included in each sub-stack 914 and other suitable numbers of sub-stacks 914 may be included in each stack 916 without departing from the scope of the present invention.

The ranging receiver 14 then identifies pairs of stacks 916 such that each pair comprises adjacent code-epoch duration sample sets 912 of the data stream 902. For example, the pair 916a comprises stack S1, which includes the first 20 code-epoch duration sample sets 912 of the data stream 902, and stack S7, which includes the second 20 code-epoch duration sample sets 912 of the data stream 902. For each such pair of stacks 916, the ranging receiver 14 forms both the sum and difference values in each of the stacks 916. The message data alignment may then be determined based on the largest pseudorange peak values for each sum and difference pair. In addition, the polarities of the largest pseudorange peak values indicate the signs for the corresponding message data bit pairs. Knowledge of whether the sum or difference provided the larger pseudorange peak value may be used to determine the order of the data bit-pair (e.g., "01" or "10" for difference and "00" or "11" for sum).

FIG. 9B is a block diagram illustrating a portion of the system 900 in greater detail in accordance with one embodiment of the present invention. The illustrated system 900 comprises a plurality of code-epoch duration sample sets 912a to 912e that comprise signal samples that are representative of the Gold code chips for the signal received from a satellite 12 at the ranging receiver 14. To determine coarse satellite message data alignment, the ranging receiver 14 begins at an arbitrary time to accumulate samples of the signal for a satellite 12 in accumulators 918.

As used herein, "coarse" alignment means alignment to within 2.5 epochs 912, which arises from the choice of epochs 912 per sub-stack 914. According to one embodiment, the number of accumulators 918 corresponds to the number of samples in an epoch 912. Thus, for the embodiment in which each epoch 912 comprises 1,023 chips and the signal-sampling rate is 2,048 samples per code epoch, the system 900 comprises 2,048 accumulators 918.

As each sample of the signal is received at the ranging receiver 14, the signal is accumulated in an accumulator 918. For example, if the sampling rate was a sample per chip and synchronous with its position in the Gold code epoch and if the ranging receiver 14 begins to accumulate samples of the Gold code with the $733^{rd}$ chip of the Gold code, the sample representing the $733^{rd}$ chip of the Gold code would be accumulated in the $A_1$ accumulator 918, the sample representative of the $734^{th}$ chip of the Gold code would be accumulated in the $A_2$ accumulator 918, and so on, with the sample representing the $732^{nd}$ chip of the Gold code accumulated in the $A_n$ accumulator 918.

After the samples of the first code-epoch duration sample set 912, which comprises an entire cycle of the Gold code, are accumulated in the accumulators 918, the samples of the next code-epoch duration sample set 912, or cycle of samples of the Gold code signal, is similarly accumulated such that each accumulator 918 accumulates the sample representing the same chip of the Gold code. Thus, while within the same navigation message data bit, the samples representing the first chip of each epoch 912 are accumulated with the same algebraic sign, and so on for all the samples in the epochs 912 representing the current message data bit. When the sign of the next message bit changes, the sign of all the signal samples representing the new message data bit are inverted and, when accumulated, diminish the previously accumulated sums.

According to the illustrated embodiment, each accumulator 918 accumulates samples for five code-epoch duration sample sets 912. However, it will be understood that the accumulators 918 may accumulate samples for any suitable number of epochs 912 without departing from the scope of the present invention.

After five code-epoch duration sample sets 912 are accumulated in the accumulators 918, the resulting values in the accumulators 918 are saved into a sub-stack 914, such as the sub-stacks 914 labeled A through M in the illustrated embodiment. The accumulators 918 may then be cleared and begin accumulating samples for the duration of the next five epochs 912 to be combined into the next sub-stack 914.

For the embodiment in which the accumulators 918 accumulate chips for the duration of five epochs 912, each sub-stack 914 comprises a combination of five code-epoch duration sample sets 912. However, it will be understood that the sub-stacks 914 may comprise any suitable number of code-epoch duration sample sets 912 based on the number of code-epoch durations accumulated in the accumulators 918 without departing from the scope of the present invention.

The sub-stacks 914 are further combined into stacks 916. According to one embodiment, each stack 916 comprises four sub-stacks 914. Thus, for the embodiment in which each sub-stack 914 comprises five code-epoch duration sample sets 912, each stack 916 comprises 20 code-epoch duration sample sets 912. This corresponds to the length of a bit of satellite navigation message data, which is 20 epochs 912. However, it will be understood that the stacks 916 may comprise any suitable number of sub-stacks 914 without departing from the scope of the present invention.

The stacks 916 are grouped into pairs of stacks 916 representing adjacent data bits. Thus, for example, the pair 916a comprises stack S1 (comprising sub-stacks A, B, C and D) and stack S7 (comprising sub-stacks E, F, G and H). The pair 916b comprises stack S2 (comprising sub-stacks B, C, D and E) and stack S8 (comprising sub-stacks F, G, H and I). For the illustrated embodiment based on sub-stacks 914 of A through M, the sub-stacks 914 may be combined into twelve stacks 916, or six pairs of stacks 916a, 916b, 916c, 916d, 916e and 916f.

To determine a coarse alignment for the satellite message data, the stacks 916 in each pair are summed and differenced and the sum and difference arrays are evaluated for pseudorange peaks. Thus, for example, the values of Stack S1 and Stack S7 are added together and subtracted from each other, while the values of Stack S2 and Stack S8 are added together and subtracted from each other, and so on for each of the six pairs of stacks 916a, 916b, 916c, 916d, 916e and 916f.

Figure 10:
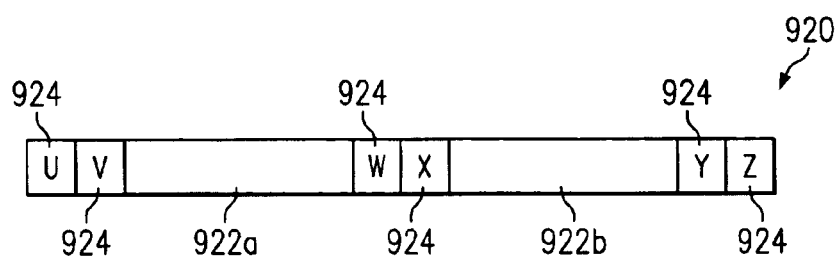
FIG. 10 is a block diagram illustrating a system for refining satellite message data alignment in the system of FIG. 1 in accordance with one embodiment of the present invention.

FIG. 10 is a block diagram illustrating a system 920 for refining satellite message data alignment in the system 10 in accordance with one embodiment of the present invention. The refining process begins with the two stacks 916 derived in the coarse alignment method described above in connection with FIG. 9.

For coarse alignment to have occurred, the two message data bits represented by the stacks producing the match, such as S1 and S7, are either of opposite logical value (e.g., . . . x, 0, 1, x . . . or . . . x, 1, 0, x . . . ) or are bounded by bits of opposite logical value (e.g., . . . 0, 1, 1, 0 . . . or . . . 1, 0, 0, 1 . . . ). These two stacks 916 are sub-divided into partial stacks 922a and 922b and refining stacks 924 V, W, X and Y.

Two refining stacks 924 U and Z may be included to provide an enlarged refining shift range with higher resolution than was used in the coarse alignment method described above in connection with FIG. 9. This refining shift range may allow the stacks 916 to be shifted earlier by an interval represented by two epochs 912 and later by the same amount of time for a more refined alignment. According to one embodiment, the refining stacks 924 are formed from the signal samples 912, which have been saved previously during the coarse alignment stacking process, as described further below.

Given that the choice of a sub-stack duration of five epochs 912 in the coarse alignment process described above provided an alignment of within 5/2, or 2.5, epochs 912, the choice of two refining stacks 924 in this illustration tests the alignment further by two refining stacks 924 and moves the alignment within 1 epoch 912, which is referred to herein as a "refined" alignment. As compared to the system 900, this system 920 reduces computational load for reaching a closer alignment by adding or subtracting only small refining-stacks 924 to the ends of the coarse alignment stacks 916 derived in the system 900.

According to one embodiment, each partial stack 922 comprises sixteen code epochs' worth of CFO-compensated signal samples and each refining stack 924 comprises two code epochs' worth. Thus, according to the embodiment in which each stack 916 comprises 20 code epochs' worth of samples, a stack 916 comprises a partial stack 922 and two refining stacks 924. For the illustrated embodiment, a refined alignment stack 916 may comprise the partial stack 922a with the refining stacks 924 of U and V, V and W, or W and X, i.e., allowing a total of three possible shifts spanning a total of four epochs 912. The corresponding stack 916 for a pair of stacks 916 may comprise the partial stack 922b with the refining stacks 924 of W and X, X and Y, or Y and Z.

According to one embodiment, the ranging receiver 14 synchronously accumulates samples of the signal from satellites 12 in the accumulators 918 as described above in connection with FIG. 9B. However, in the event that refined alignment will be performed, pairs of code-epoch duration sample sets formed by the system 900 during the coarse alignment process are temporarily stored for later use in the refined alignment process. In this case, when the coarse alignment has been determined, additional refining stacks 924 U, V, W, X, Y and Z are formed out of the corresponding sample-set pairs saved.

For this embodiment, the number of epoch summations to be performed to reach a particular alignment quality is reduced over the number required if the system 900 is used. First, summing each of the six refining stacks 924 results in six sums. Second, the aligning stacks 916 may be shifted by adding or subtracting the appropriate refining stacks 924 to shift the alignment in the desired direction.

For example, if the desired shift is to the left (earlier), then the shifted S1 stack 916 would include S1+U–W, and the shifted S7 stack 916 would include S7+W–Y. Once these shifted stacks 916 have been formed, the shifted stacks 916 are evaluated as described in relation to the system 900 above. If the desired shift is to the right (later), then the shifted S1 stack 916 would include S1+X–V, and the shifted S7 stack 916 would include S7+Z–X, and the outcome would again be evaluated as described in relation to the system 900 above. Thus, only two additional single-epoch duration adds and subtracts per stack pair, over the computations carried out in the coarse alignment process using the system 900, allows the alignment to be refined to within about one epoch 912.

This process of alignment refinement by smaller shifts may be extended to achieve any suitable degree of alignment refinement, but alignment to within less than an epoch's duration yields very little additional processing gain.

Once a coarse or, if desired, a refined alignment has been achieved, the alignment may be used to decode the continuing satellite message data, two message data bits at a time, by carrying out a simpler, 20 plus 20 code-epoch stacking routine for each of the subsequent bit pairs. The magnitude and polarity of the sum or difference determines the values of the respective message data bits.

FIG. 11 is a flow diagram illustrating a method for aligning message data in the ranging receiver 14 in accordance with one embodiment of the present invention. The method begins at step 1100 where the ranging receiver 14 generates sub-stacks 914 based on epochs 912 accumulated in the accumulators 918. At step 1102, the ranging receiver 14 combines the sub-stacks 914 into stacks 916 which are grouped together in pairs. At step 1104, the ranging receiver 14 calculates a sum and difference for each pair of stacks 916.

At step 1106, the ranging receiver 14 determines the maxima of the pseudorange peaks, the peaks being based on correlations of the stacks 916 with the satellite Gold codes. According to one embodiment, this is accomplished by searching for the six largest values in the correlates of the sum and difference stacks, along with the offsets at which the maxima occur. After the maxima are found, a satellite ID is determined from the Gold code yielding the peak and the pseudorange is determined by the centroid of the correlation peak. In this way, the satellite message data may be aligned to within 2.5 epochs 912.

At decisional step 1108, a determination is made regarding whether or not the alignment is to be refined. If the alignment is not to be refined, the method follows the No branch from decisional step 1108 and comes to an end.

However, if the alignment is to be refined, the method follows the Yes branch from decisional step 1108 to step 1109.

At step 1109, the ranging receiver 14 identifies partial stacks 922 and refining stacks 924 which may be combined into stacks 916. At step 1110, the ranging receiver 14 determines sums for the refining stacks 924. At step 1112, the ranging receiver 14 shifts the stacks 916 based on the refining stacks 924, as described in more detail above in connection with FIG. 10. At step 1114, the ranging receiver 14 determines a refined alignment based on the shifted stacks 916, at which point the method comes to an end. In this way, the satellite message data may be aligned to within 0.5 epochs 912.

FIG. 12 is a flow diagram illustrating a method for predicting satellite message data received in positioning signals at the ranging receiver 14 in accordance with one embodiment of the present invention. The method begins at decisional step 1200 where a determination is made regarding the status of a superframe in the ranging receiver 14.

If no superframe is present in the ranging receiver 14 or if the superframe is expired, the method follows the Expired branch from decisional step 1200 to step 1202. The superframe may be considered expired if the superframe is greater than 96 hours old. However, it will be understood that the superframe may be considered expired based on another suitable amount of time or other suitable criteria without departing from the scope of the present invention. At step 1202, the ranging receiver 14 downloads the superframe from the satellites 12 or from the geolocation processor 24.

If the superframe in the ranging receiver 14 is not current, the method follows the Not Current branch from decisional step 1200 to step 1204. The superframe may be considered not current if the superframe is between 4 and 96 hours old. However, it will be understood that the superframe may be considered not current based on another suitable amount of time or other suitable criteria without departing from the scope of the present invention. At step 1204, the ranging receiver 14 downloads an update to the superframe from the satellites 12 or from the geolocation processor 24.

Any data obtained from the geolocation processor 24 in steps 1202 or 1204 may be obtained over the voice channel using the modems 40 or via an alternate pathway using, for example, a control channel for the wireless carrier network 20 or other suitable data pathway.

Returning to decisional step 1200, if the superframe in the ranging receiver 14 is current, the method follows the Current branch from decisional step 1200 to decisional step 1206. Also, after a superframe has been downloaded in step 1202 or an update has been downloaded in step 1204, the method continues to decisional step 1206. The superframe may be considered current if the superframe is less than 4 hours old. However, it will be understood that the superframe may be considered current based on another suitable amount of time or other suitable criteria without departing from the scope of the present invention.

At decisional step 1206, a determination is made regarding whether or not the real-time clock 232 has the current time. If the real-time clock 232 does not have the current time, the method follows the No branch from decisional step 1206 to step 1208. At step 1208, the real-time clock 232 for the ranging receiver 14 is calibrated, or synchronized, to GPS time based on a remote clock or TOD information in the positioning signals. Once calibrated, the real-time clock 232 keeps track of GPS time.

At step 1210, the ranging receiver 14 sets up a common table that is operable to store data that is common to the superframe for each satellite in the constellation of satellites. According to one embodiment, approximately 60% of the superframe is common to each satellite in the constellation.

At step 1212, for each of the satellites, the ranging receiver 14 sets up a unique table that is operable to store data that is unique to the superframe of the corresponding satellite. For example, this unique data may comprise ephemeris data, telemetry data, tropospheric data, ionospheric propagation models, and other suitable data relating to the satellite. At this point, along with time and date information from the real-time clock 232 at the time it is required, the message predictor has been set up for subsequent use by the ranging receiver 14 in predicting satellite message data for a specified satellite 12 from which positioning signals are received. From step 1212, the method continues to step 1214.

Returning to decisional step 1206, if the real-time clock 232 has the current time, the method follows the Yes branch from decisional step 1206 to decisional step 1215. At decisional step 1215, a determination is made regarding whether the prediction tables, which include the common table and the unique tables, are current. Each of the prediction tables may comprise any suitable data store. If the prediction tables are not current, the method follows the No branch from decisional step 1215 and proceeds to step 1210 where the ranging receiver 14 sets up a common table.

However, if the prediction tables are current, the method follows the Yes branch from decisional step 1215 to step 1214. At step 1214, the ranging receiver 14 begins to predict a message fragment. At step 1216, the ranging receiver 14 identifies the satellite 12, and the time interval, corresponding to the message fragment to be predicted. At step 1218, the ranging receiver 14 generates a message fragment table for predicting the message fragment.

At step 1220, the ranging receiver 14 adds data from the common table to the message fragment table. At step 1222, the ranging receiver 14 adds data from the unique table for the satellite 12 identified in step 1216 to the message fragment table. At step 1224, the ranging receiver 14 adds time-dependent data, such as bit transition timing information, to the message fragment table based on the current GPS time obtained from the real-time clock 232.

At step 1226, the ranging receiver 14 provides the predicted message fragment, which comprises the data for predicting the satellite message data, to the requester. Thus, in this way, the ranging receiver 14 may predict the satellite message data in the positioning signals so that the message data may be removed after alignment, which may be performed as described above in connection with FIGS. 9, 10 and 11.

Figures 1, 13A:
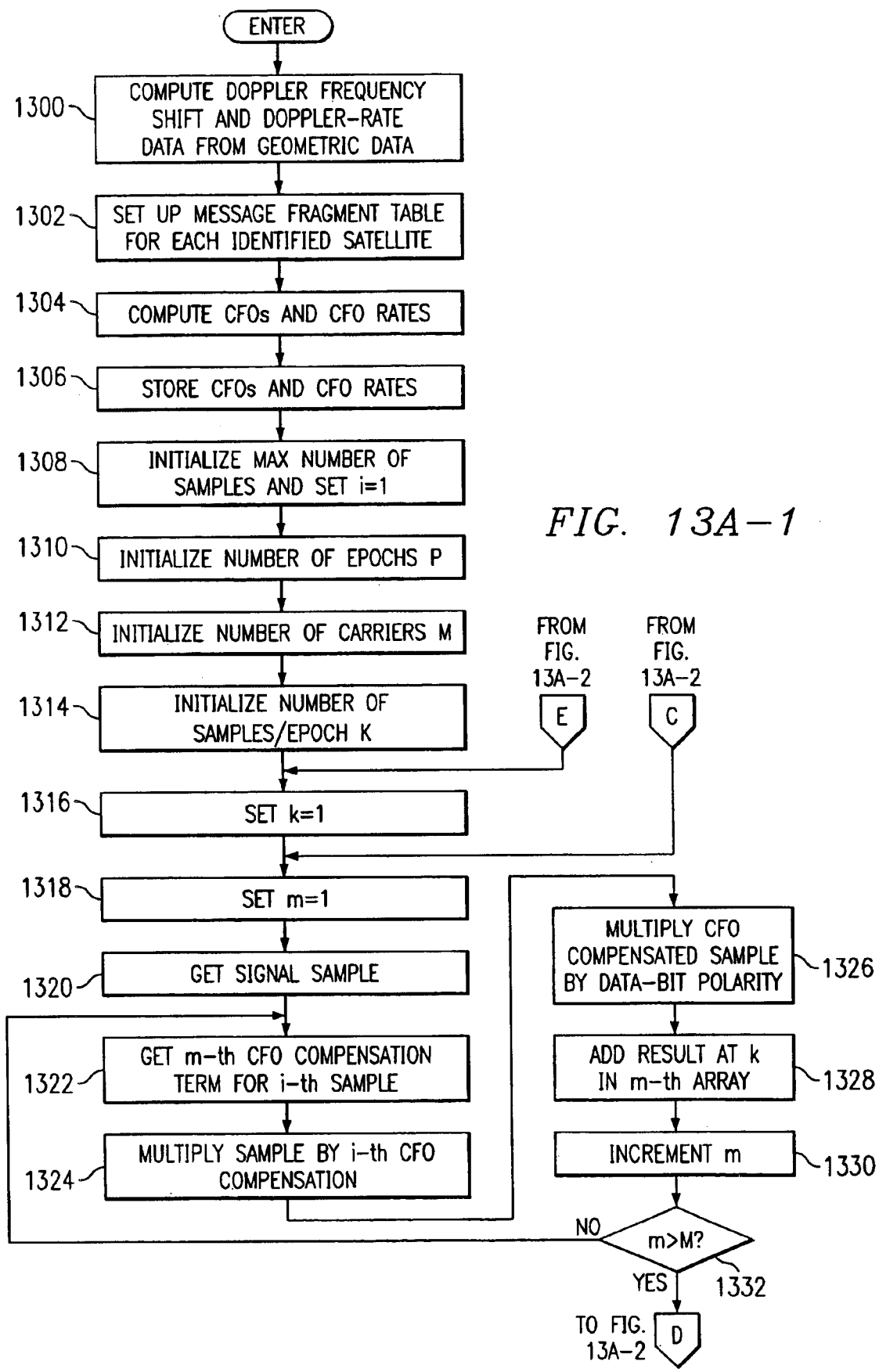
FIGS. 13A, 13B and 13C are flow diagrams illustrating a method for determining a pseudorange in the ranging receiver of FIGS. 1, 2 or 3 in a geometric mode in accordance with one embodiment of the present invention.
Figures 2, 13A:
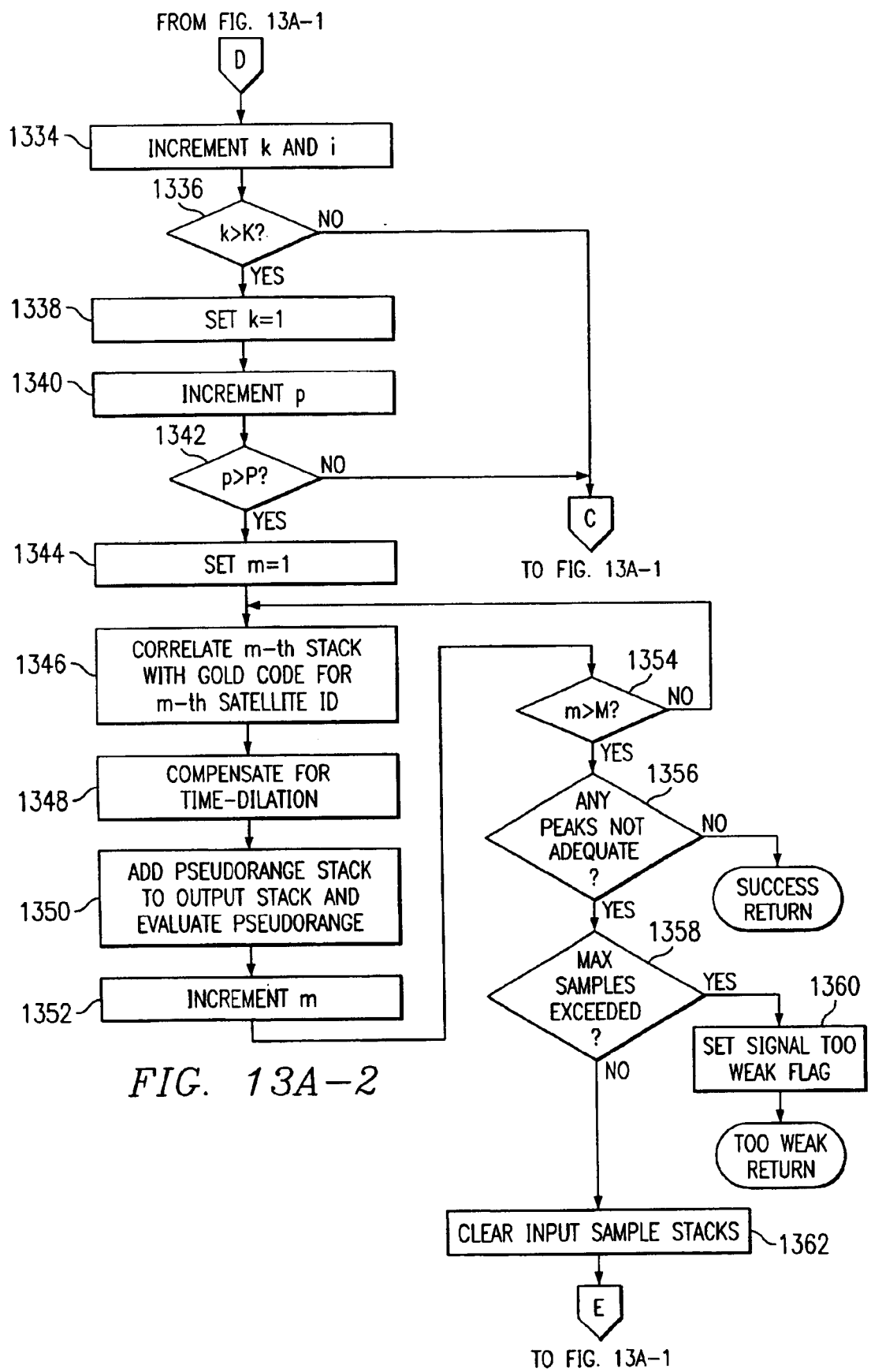
Figure 13B:
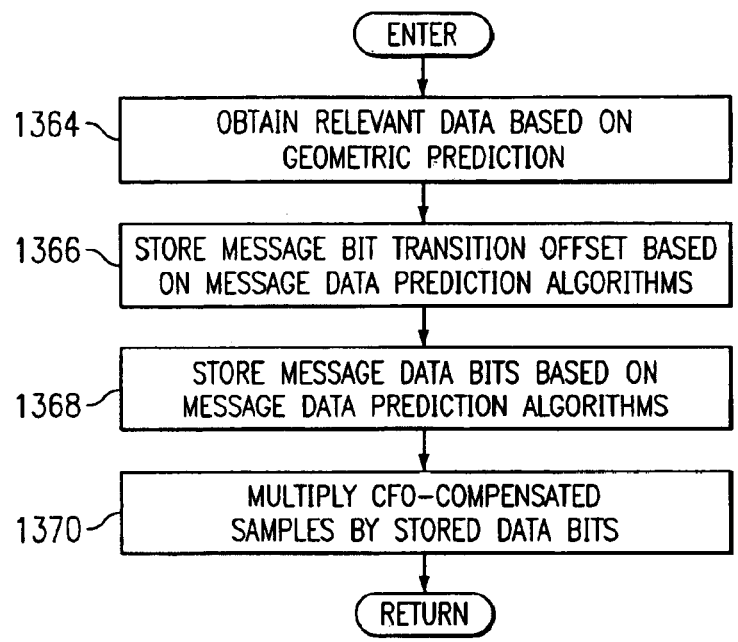
Figure 13C:
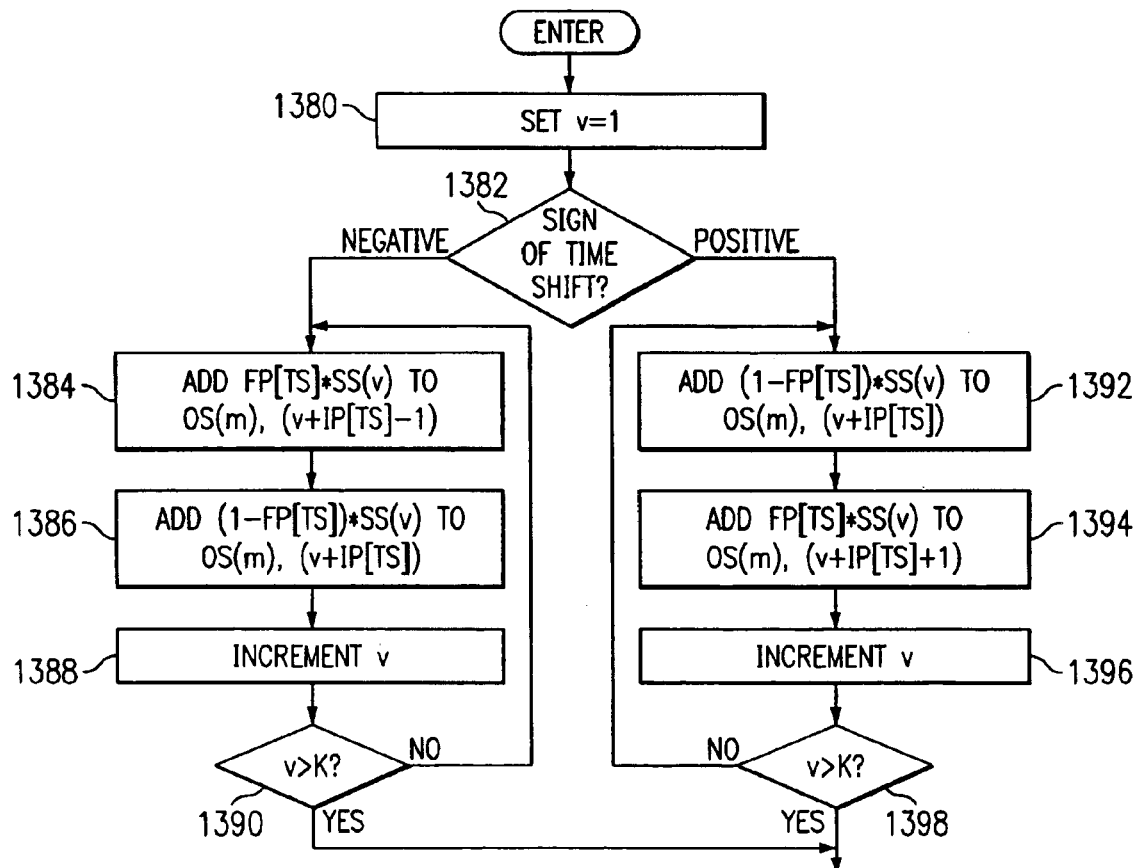

FIGS. 13A, 13B and 13C are flow diagrams illustrating a method for determining a pseudorange estimate in the ranging receiver 14 in a geometric mode in accordance with one embodiment of the present invention. The method provides for determining a pseudorange based on the availability at the ranging receiver 14 of: (i) accurately known real time (with reference to the satellite constellation and within about a millisecond); (ii) an estimate of the current location of the ranging receiver 14 (within about a mile); (iii) an estimate of the frequency bias of the ranging receiver 14; (iv) recent (within about 24 hours) ephemeris data; and (v) recent (within about 96 hours) constellation superframe data.

For example, real time data may be received from a first set of satellites, ephemeris data may be received from a second set of satellites, and superframe data may be received from a third set of satellites. The sets of satellites, which may each comprise one or more satellites, may comprise none, some or all of the same satellites in the satellite constellation. According to one embodiment, the first set of satellites comprises one of the in-view satellites 12, the second set of satellites comprises at least four of the in-view satellites 12, and the third set of satellites comprises one of the satellites in the constellation. In an alternative embodiment, the application server 64 and/or the workstation 46 may serve as a satellite information server from which ephemeris data and/or superframe data may be received.

In FIG. 13A, the method begins at step 1300 where the ranging receiver 14 determines a set of Doppler frequency shift, Doppler-rate and satellite ID data for a selected set of satellites from calculations based on the current geometric data referred to above. This set of data may be selected from among the satellites 12 potentially viewable from the location of the ranging receiver 14 at that time. This selection may be based on suitable criteria, such as low geometric dilution of precision, low elevation angle, or any suitable criteria. At step 1302, for each satellite 12 in the set, the ranging receiver 14 sets up a table of message data bits that will be transmitted during the time that pseudorange samples will be processed.

At step 1304, the ranging receiver 14 computes the CFO and CFO-rate for each of the satellites 12. The CFO is determined by adding the frequency bias of the ranging receiver 14 to the computed Doppler frequency shift. The ranging receiver 14 then assigns the Doppler rate to the CFO-rate for each of the satellites 12. At step 1306, the ranging receiver 14 stores the CFOs and the corresponding CFO-rates in a table.

At step 1308, the ranging receiver 14 initializes a maximum number of samples, I, and sets a sample counter, i, to one. The maximum number of samples may be chosen to limit the maximum integration time to suit the application, such as 10 to 30 seconds, but other values outside this range are also possible. At step 1310, a number of epochs, P, to be averaged is initialized. The number of epochs (which corresponds to the number of samples) to be averaged during one loop-through may be selected according to various criteria, such as the total processing gain to be provided per loop-through, the amount of memory available for table or intermediate result storage and any other suitable criteria. At step 1312, a number of carriers, M, is initialized.

At step 1314, a number of samples per epoch, K, is initialized. At step 1316, the ranging receiver 14 sets the epoch sample number, k, to a value of one. At step 1318, the ranging receiver 14 sets the carrier counter, m, to a value of one.

At step 1320, the ranging receiver 14 gets a signal sample for processing. At step 1322, the ranging receiver 14 gets the $m^{th}$ CFO compensation term for the $i^{th}$ sample. At step 1324, the ranging receiver 14 complex multiplies the sample by the CFO compensation term. At step 1326, the ranging receiver 14 scalar multiplies the CFO-compensated sample by its corresponding data bit polarity, which may be determined in accordance with the method of FIG. 13B.

At step 1328, the ranging receiver 14 adds the result of the multiplication in step 1326 to a location identified by k in an $m^{th}$ array. At step 1330, the ranging receiver 14 increments m. At decisional step 1332, a determination is made regarding whether or not m is greater than M. If m is not greater than M, the method follows the No branch from decisional step 1332 and returns to step 1322. However, if m is greater than M, the method follows the Yes branch from decisional step 1332 to step 1334. At step 1334, the ranging receiver 14 increments both k and i.

At decisional step 1336, a determination is made regarding whether or not k is greater than K. If k is not greater than K, the method follows the No branch from decisional step 1336 and returns to step 1318 where m is set to a value of one. However, if k is greater than K, the method follows the Yes branch from decisional step 1336 to step 1338. At step 1338, the ranging receiver 14 sets k to a value of one. At step 1340, the ranging receiver 14 increments p.

At decisional step 1342, a determination is made regarding whether or not p is greater than P. If p is not greater than P, the method follows the No branch from decisional step 1342 and returns to step 1318 where m is set to a value of one. However, if p is greater than P, the method follows the Yes branch from decisional step 1342 to step 1344. At step 1344, the ranging receiver 14 sets m to a value of one.

At step 1346, the ranging receiver 14 correlates an $m^{th}$ pseudorange stack with a Gold code for an $m^{th}$ satellite ID. At step 1348, the ranging receiver 14 compensates for time dilation by correlation peak shifting. According to one embodiment, time-dilation compensation may be accomplished by vector rotation in the frequency domain during the correlation by FFT means during step 1346. According to another embodiment, time-dilation compensation may be accomplished by suitable sub-stack sample shifting prior to final accumulation and conversion to pseudorange by correlation. In yet another embodiment, the time-dilation compensation may be performed in accordance with the time-shifting method of FIG. 13C. At step 1350, the pseudorange stack is added to an $m^{th}$ extended output stack and the $m^{th}$ pseudorange is evaluated for an adequate peak. At step 1352, the ranging receiver 14 increments m.

At decisional step 1354, a determination is made regarding whether or not m is greater than M. If m is not greater than M, the method follows the No branch from decisional step 1354 and returns to step 1346 where the $m^{th}$ pseudorange stack is correlated with the Gold code of the $m^{th}$ satellite ID for the incremented m. However, if m is greater than M, the method follows the Yes branch from decisional step 1354 to decisional step 1356.

At decisional step 1356, a determination is made regarding whether any peak is not adequate. If each peak is adequate, then the minimum number, M, of pseudoranges has been detected successfully and the method follows the No branch from decisional step 1356 and comes to an end. In this way, a pseudorange may be determined in the range of 1 to 30 seconds based on received signals comprising a minimum carrier-to-noise density ratio in the range of 5 dB to 10 dB. However, if any peak is found to be not adequate, the method follows the Yes branch from decisional step 1356 to decisional step 1358.

At decisional step 1358, a determination is made regarding whether or not a maximum number of samples, I, has been exceeded. If the maximum number of samples has been exceeded, the method follows the Yes branch from decisional step 1358 to step 1360. At step 1360, a flag is set to indicate that the signal is too weak for the minimum number, M, of pseudoranges to be detected successfully, at which point the method comes to an end.

Returning to decisional step 1358, if the maximum number of samples has not been exceeded, the method follows the No branch from decisional step 1358 to step 1362. At step 1362, the ranging receiver 14 clears the input sample stacks. At this point, the method returns to step 1316 where k is set to a value of one.

FIG. 13B is a flow diagram illustrating a method for removing message data modulation in the method of FIG. 13A in accordance with one embodiment of the present invention. The method begins at step 1364 where, based on geometric prediction, the ranging receiver 14 obtains satellite IDs, Doppler frequency shift, and Doppler rates. At step 1366, the ranging receiver 14 stores a message bit transition offset, T(m), for each of the M satellites 12 based on the results of the method for predicting satellite message data described in FIG. 12. These offsets also include the signal transit time to the ranging receiver 14 for each satellite 12.

At step 1368, the ranging receiver 14 stores a specified number of message data bits for each satellite 12 based on the results of the method for predicting satellite message data described in FIG. 12. According to one embodiment, the specified number of message data bits is equal to the result of dividing (a) the maximum number of samples by (b) 20 times the product of the sampling rate (samples per chip) and the chips per epoch. However, it will be understood that any suitable number of message data bits may be stored without departing from the scope of the present invention. Also, according to one embodiment, message data bits of logical (1) and (0) may be stored as values of +1 and −1, respectively, or as values of −1 and +1, respectively. However, it will be understood that the message data bits may be stored in any suitable manner without departing from the scope of the present invention.

At step 1370, the ranging receiver 14 multiplies the CFO-compensated samples by the corresponding stored message data bits. According to one embodiment, for the $m^{th}$ satellite, the value of the pointer to the message data bit may be determined by the ranging receiver 14 based on the following formula:

$$\text{IntegerPart } [\{T(m)+i\}/K]+1,$$

where T(m) is the message bit transition offset for the message bits from the $m^{th}$ satellite 12, i is the sample number and K is the number of samples per epoch.

FIG. 13C is a flow diagram illustrating a method for compensating for time dilation in the method of FIG. 13A in accordance with one embodiment of the present invention. In this method, a time offset, t, from the beginning of the analysis to the beginning of the current sub-stack has a value of i-PK when the routine is entered from step 1348 of FIG. 13A. The $m^{th}$ Doppler at the beginning of this sub-stack, n(m), is equal to d(m)+t r(m), where d(m) is the $m^{th}$ Doppler at the beginning of the analysis and r(m) is the $m^{th}$ Doppler rate expressed in per-sample terms, rather than per-second terms. The average of the $m^{th}$ Doppler, ad(m), from the beginning of the current analysis to the beginning of the current sub-stack is equal to d(m)+(t r(m))/2. The average of the $m^{th}$ Doppler in the current sub-stack, adstack(m), is equal to n(m)+t r(m)/2. The time shift to the beginning of this sub-stack, Del(m), is equal to ad(m)Tt/f(c) in second terms and ad(m)t/fc in sample terms. The time shift within the current sub-stack, Dstack(m), is equal to adstack(m) TPK/f(c) in second terms and ad(m)PK/fc in sample terms. The total time shift, TS(m), is equal to Del(m)+Dstack(m).

In addition, the following variables are defined for the purpose of this illustration, without limiting the application to only the GPS satellite constellation characteristics, as follows: i=sample number; M=number of carriers; d(m)=value of Doppler frequency shift, per instance of m; n(m)=value of Doppler at the beginning of the stacking process (i.e., when i=1)+the accumulated bias rate up to the beginning of the current sub-stack, per instance of m; r(m)=value of Doppler rate, per instance of m; K=number of samples per epoch; P=number of epochs per integration cycle; S=number of samples per sub-stack; c=speed of light; f(c)=GPS satellite carrier frequency (i.e., 1575.42 MHz); T=interval between samples; v=sample index within current sub-stack; u=sample index within extended output stack; TS=total time shift; SS=sub-stack sample; OS=output stack sample; FP[ ]=FractionalPart of; and IP[ ]=IntegerPart of.

The method begins at step 1380 where the ranging receiver 14 sets the sample index, v, to a value of one. At decisional step 1382, a determination is made regarding whether the time shift is positive or negative (which depends on, and is opposite to, the sign of the Doppler frequency shift). If the time shift is negative, the method follows the Negative branch from decisional step 1382 to step 1384. At step 1384, the ranging receiver 14 adds (FP[TS])*SS(v) to OS(m), (v+IP[TS]−1). At step 1386, the ranging receiver 14 adds (1−FP[TS])*SS(v) to OS(m), (v+IP[TS]). At step 1388, the ranging receiver increments v.

At decisional step 1390, a determination is made regarding whether or not v is greater than K. If v is not greater than K, the method follows the No branch from decisional step 1390 and returns to step 1384. However, if v is greater than K, pseudorange peaks may be evaluated and the method follows the Yes branch from decisional step 1390 and returns to step 1350 in FIG. 13A.

Returning to decisional step 1382, if the time shift is positive, the method follows the Positive branch from decisional step 1382 to step 1392. At step 1392, the ranging receiver 14 adds (1−FP[TS])*SS(v) to OS(m), (v+IP[TS]). At step 1394, the ranging receiver 14 adds FP[TS]*SS(v) to OS(m), (v+IP[TS]+1). At step 1396, the ranging receiver 14 increments v.

At decisional step 1398, a determination is made regarding whether or not v is greater than K. If v is not greater than K, the method follows the No branch from decisional step 1398 and returns to step 1392. However, if v is greater than K, pseudorange peaks may be evaluated and the method follows the Yes branch from decisional step 1398 and returns to step 1350 in FIG. 13A.

Figure 14:
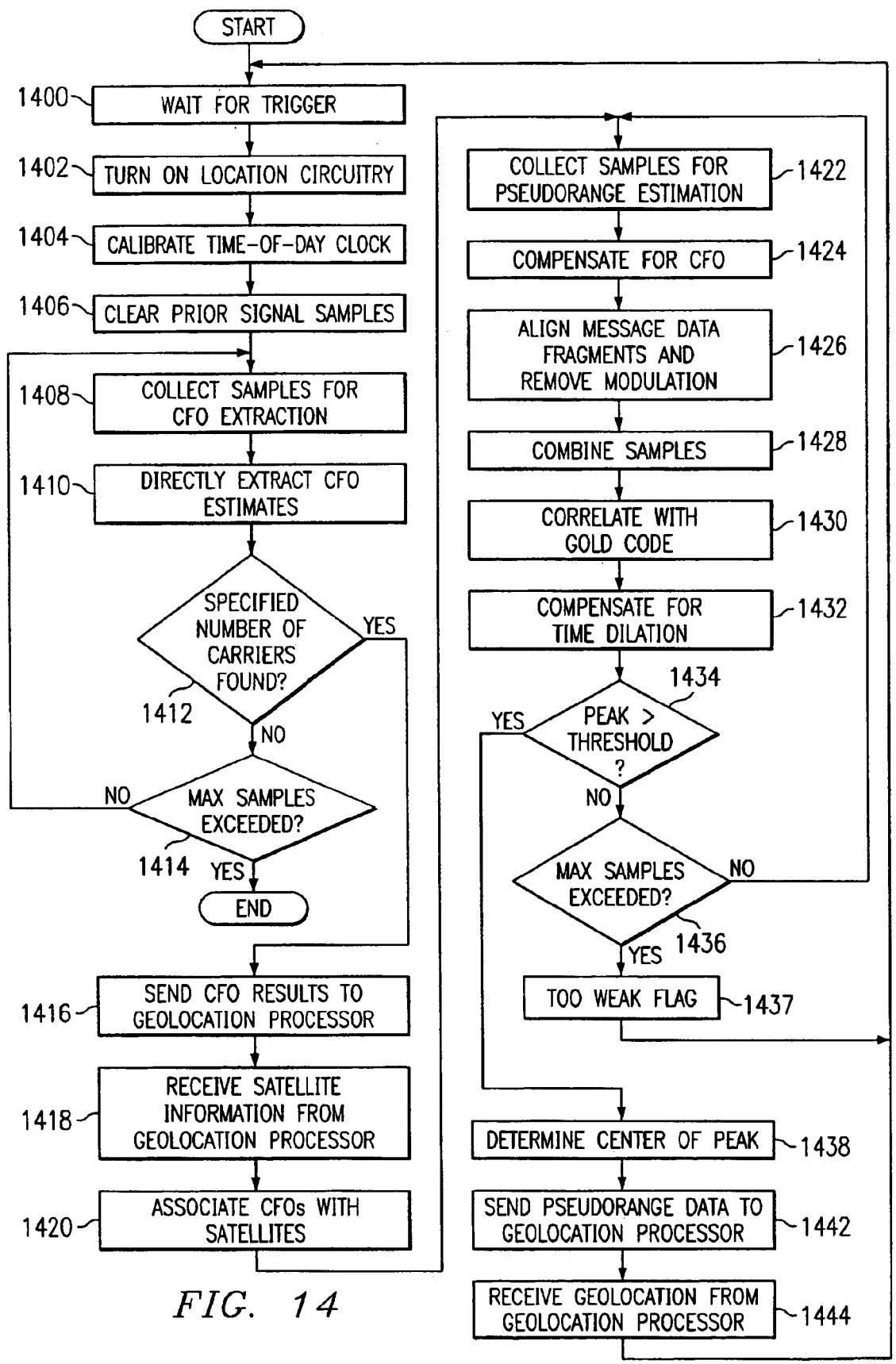
FIG. 14 is a flow diagram illustrating a method for determining geolocation in the ranging receiver of FIGS. 1, 2 or 3 with matching assistance in accordance with one embodiment of the present invention.

FIG. 14 is a flow diagram illustrating a method for determining geolocation in the ranging receiver 14 with matching assistance in accordance with one embodiment of the present invention. The method begins at step 1400 where the ranging receiver 14 waits in a low-power standby mode for a trigger to start the pseudorange estimating process. The trigger may comprise a request generated by the wireless device 16 automatically, a request generated by a user of the wireless device 16 such as by pushing a button 30 on the ranging receiver 14, a request from an external source such as the Internet, a geolocation processor 24 or other suitable external source, or any other suitable trigger.

Once the trigger is received, the location circuitry of the ranging receiver 14 is turned on at step 1402. Thus, for example, the power management circuitry 230 may provide full power to each of the components 204, 206, 208, 210, 212, 214, 216, 218, 220 and 222 after receiving the trigger.

At step 1404, the real-time clock 232 for the ranging receiver 14 is calibrated, or synchronized, to a remote clock across the wireless link or based on TOD information in the positioning signals. Once calibrated, the real-time clock 232 keeps track of real time so that the timing of events in the ranging receiver 14 can be accurately tracked.

At step 1406, the ranging receiver 14 clears any prior signal samples in the signal sample memory 216. At step 1408, the ranging receiver 14 begins to collect samples for carrier detection by direct CFO extraction from the signals received from the satellites 12. At step 1410, the CFOs are directly extracted from the samples, as described in more detail above in connection with FIGS. 6A and 6B.

At decisional step 1412, a determination is made regarding whether at least a specified number of significant carriers and their CFOs have been found. According to one embodiment, the specified number is four. However, it will be understood that the specified number may comprise any suitable number. If the specified number of significant carriers has not been found, the method follows the No branch from decisional step 1412 to decisional step 1414.

At decisional step 1414, a determination is made regarding whether a maximum number of collected CFO extraction samples has been exceeded. According to one embodiment, the maximum number of collected samples comprises the number of samples that may be collected in approximately one second. Thus, the maximum number of collected samples may be based on the sampling rate. However, it will be understood that the maximum number of collected samples may be any suitable number.

If the maximum number of collected CFO extraction samples has been exceeded, this indicates that the signals being received at the ranging receiver 14 are too weak to be used. In this situation, the method follows the Yes branch from decisional step 1414 and comes to an end. However, if the maximum number of collected CFO extraction samples has not been exceeded, the method follows the No branch from decisional step 1414 and returns to step 1408 for the collection of more signal samples for CFO extraction.

Returning to decisional step 1412, if the specified number of significant carriers has been found, the method follows the Yes branch from decisional step 1412 to step 1416. At step 1416, the ranging receiver 14 sends CFO results to the geolocation processor 24 through the service center 18. According to one embodiment, the CFO results comprise the CFO estimates, the real time for the CFO estimate measurements and/or other suitable data related to the CFO estimates. At step 1418, the ranging receiver 14 receives satellite information from the geolocation processor 24. The satellite information may comprise satellite IDs, the most recent satellite message data fragments, and bit transition information for each of the satellites 12 identified by the geolocation processor 24 based on the CFO results and/or any other suitable information.

At step 1420, the ranging receiver 14 associates the CFOs with their respective satellites 12 based on the satellite information received from the geolocation processor 24. At step 1422, the ranging receiver 14 begins to collect samples for pseudorange estimation from the signals received from the satellites 12. At step 1424, the ranging receiver 14 begins to process the pseudorange samples by compensating the samples for the CFOs.

At step 1426, the ranging receiver 14 aligns satellite message data fragments with the pseudorange samples and removes the message data modulation from the samples by multiplying out the biphase message data modulation, as described in more detail above in connection with FIGS. 8, 9, 10, 11 and 12.

At step 1428, the ranging receiver 14 linearly combines, or stacks, the samples into a single stack result of one-epoch duration for each satellite 12. At step 1430, the ranging receiver 14 correlates the single epoch-duration stack with the Gold codes for the satellites 12.

According to one embodiment, the ranging receiver 14 correlates the single epoch-duration stack result with the Gold codes by Fourier transform. For this embodiment, the Fourier transform of each CFO-compensated stack of samples is multiplied by the Fourier transform of the time-reversed series of the Gold code for a satellite 12 (sampled at the same rate as the pseudorange samples and stored in memory 216 or 220). The product is then either compensated for time-dilation by complex vector multiplication in the frequency domain before it is inverse-Fourier transformed to yield the time-dilation compensated pseudorange time sequence, or the product is inverse-Fourier transformed to yield the un-compensated pseudorange time sequence, which is compensated for time dilation by element-shifting, as described in FIG. 13C, at step 1432.

According to an alternative embodiment, the ranging receiver 14 correlates the single epoch-duration stack result with the respective Gold code in hardware, such as a convolution processor using over 2,000 correlators per satellite signal. Such processors have as many correlators per satellite channel as there are samples per code epoch, with each correlator having the same number of stages as the number of samples per code epoch. In other words, each satellite channel uses $N^2$ correlator stages, where N=number of samples per code epoch. (See, e.g., the paper titled "Indoor GPS Technology" by Frank van Diggelen & Charles Abrams of Global Locate, Inc., presented at the CTIA Wireless Agenda, Dallas, May 2001.)

At decisional step 1434, a determination is made regarding whether a correlation peak exists in each of the pseudorange time sequences that is sufficiently above a noise-background threshold. According to one embodiment, a correlation peak is sufficiently above the noise-background threshold when the correlation peak is at least 6 dB above the noise-background threshold. However, it will be understood that a correlation peak may be sufficiently above the noise-background threshold when the correlation peak is any suitable level above the noise-background threshold. If such a peak does not exist for any of the pseudorange time sequences, the method follows the No branch from decisional step 1434 to decisional step 1436.

At decisional step 1436, a determination is made regarding whether a maximum number of signal samples that have been combined for pseudorange estimation has been exceeded for the pseudorange time sequences without a correlation peak. According to one embodiment, the maximum number of signal samples that have been combined for pseudorange estimation comprises the number of samples that may be combined in approximately one second. Thus, the maximum number of signal samples that have been combined for pseudorange estimation may be based on the sampling rate. However, it will be understood that the maximum number of combined samples may be any suitable number.

If the maximum number of combined pseudorange samples has been exceeded, this indicates that the corresponding pseudorange signals being received are too weak at the ranging receiver 14 to be used. In this situation, the method follows the Yes branch from decisional step 1436 to step 1437. At step 1437, the ranging receiver 14 sets a flag to indicate that the signal is too weak and returns to step 1400 where the ranging receiver 14 reverts to the low-power standby condition and waits for another trigger. However, if the maximum number of combined pseudorange samples has not been exceeded, the method follows the No branch from decisional step 1436 and returns to step 1422 to collect more signal samples for pseudorange estimation.

Returning to decisional step 1434, if a correlation peak that is sufficiently above the noise-background threshold does exist for each of the pseudorange time sequences, the method follows the Yes branch from decisional step 1434 to step 1438. At step 1438, a multi-path correcting centroid calculation is applied to determine a substantially exact location of the center of each of the peaks based on techniques that compensate for the distortion of each peak's shape by the presence of multi-path signals occurring near the correlation peak.

At step 1442, the ranging receiver 14 sends pseudorange data for each of the carriers detected from the constellation of satellites 12 to the geolocation processor 24 for calculation of the geolocation of the ranging receiver 14. According to one embodiment, the pseudorange data comprises the estimate of the pseudorange, the measurement time, the satellite ID for each satellite 12 and/or any other suitable data. At step 1444, the ranging receiver 14 or other requesting application receives the geolocation of the ranging receiver 14 from the geolocation processor 24, after which the method returns to step 1400 where the ranging receiver 14 reverts to the low-power standby condition and waits for another trigger.

FIG. 15 is a flow diagram illustrating a method for determining geolocation in the geolocation processor 24 by providing matching assistance in accordance with one embodiment of the present invention. The method begins at step 1500 where the geolocation processor 24 receives geolocation initiating information. For example, the geolocation initiating information may comprise protocol identifying information and version information for the ranging receiver 14 provided by the ranging receiver 14 in response to a trigger. However, it will be understood that the geolocation initiating information may comprise any suitable information related to the initiation of the geolocation process. According to one embodiment, the geolocation initiating information is received from the ranging receiver 14 over the voice channel for the wireless device 16 by way of the service center 18.

At step 1502, the geolocation processor 24 sends an acknowledgement of the receipt of the geolocation initiating information. For example, the geolocation processor 24 may transmit a handshake code to the ranging receiver 14 in order to establish communication and acknowledge compatibility.

At step 1504, the geolocation processor 24 receives a time calibration signal from the ranging receiver 14. The time calibration signal may comprise a complete sequence of, for example, a maximal length pseudorandom noise sequence or a Barker code modulated on an audio carrier tone. It will be understood, however, that the time calibration signal may comprise any other suitable timing signal.

At step 1506, the geolocation processor 24 sends a time calibration response based on the time calibration signal. According to one embodiment, the geolocation processor 24 sends the time calibration response a pre-defined period of time after receiving the time calibration signal. For example, the pre-defined period of time may comprise 10 milliseconds or other suitable period of time. The time calibration response may comprise a different maximal length pseudorandom noise sequence modulated on the same carrier tone as the time calibration signal, followed by a message indicating a real time associated with the response. The real time information may be used by the ranging receiver 14 in order to calibrate the real-time clock 232.

At step 1508, the geolocation processor 24 receives CFO estimates from the ranging receiver 14. At step 1510, the geolocation processor 24 matches the differences in the CFO estimates from the ranging receiver 14 to differences in Doppler frequency shift measurements for signals received by the receivers 48 and/or 60 or based on geometric prediction from the satellite constellation's current geometric data.

At step 1512, any duplicate matches found in step 1510 are eliminated in order to identify the satellites 12. According to one embodiment, duplicate matches are eliminated by a least-squares regression method. At step 1514, the geolocation processor 24 sends satellite information to the ranging receiver 14. The satellite information may comprise the satellite IDs, the satellite message data patterns, the timing information for bit transitions in the satellite message data patterns and/or any other suitable information.

At step 1516, the geolocation processor 24 receives pseudorange data, which is generated based on the satellite information, from the ranging receiver 14. The pseudorange data may comprise an estimate of the pseudorange, a measurement time, a satellite ID for each satellite 12 and/or any other suitable data.

At step 1518, the geolocation processor 24 determines the geolocation of the ranging receiver 14 based on the pseudorange data, the current ephemeris data and/or any other suitable information. At step 1520, the geolocation processor 24 sends the geolocation of the ranging receiver 14 to the requesting application, at which point the method comes to an end. The geolocation may be sent in-band over the voice channel of the wireless device 16, over the data network 66, or by any other suitable means.

Although the present invention has been described with several embodiments, various changes and modifications may be suggested to one skilled in the art. It is intended that the present invention encompass such changes and modifications as fall within the scope of the appended claims.

What is claimed is:

1. A method for aligning message data bits in positioning signals received at a ranging receiver, the positioning signals comprising a plurality of epochs, the method comprising:
   combining, for each of a plurality of stacks, a specified number of sub-stacks into the stack, each sub-stack comprising a specified number of epochs;
   grouping the stacks into pairs of stacks, each pair of stacks comprising a first stack and a second stack, the epochs included in the first stack adjacent to the epochs included in the second stack;
   summing, for each pair of stacks, the first stack and the second stack to generate a first result stack;
   subtracting, for each pair of stacks, the second stack from the first stack to generate a second result stack;
   evaluating the first result stacks and the second result stacks to identify pseudorange peaks; and
   aligning the message data bits based on a magnitude of the identified pseudorange peaks.

2. The method of claim 1, evaluating the first result stacks and the second result stacks to identify pseudorange peaks comprising determining which of the first and second result stacks has a greater absolute value.

3. The method of claim 2, evaluating the first result stacks and the second result stacks to identify pseudorange peaks further comprising determining a sign for the corresponding message data based on a polarity for the result having the greater absolute value.

4. The method of claim 1, the specified number of epochs comprising five and the specified number of sub-stacks comprising four.

5. The method of claim 1, the specified number of epochs comprising four the specified number of sub-stacks comprising five.

6. The method of claim 1, each message data bit comprising twenty epochs.

7. A system for aligning message data bits in positioning signals received at a ranging receiver, the positioning signals comprising a plurality of epochs, the system comprising:
   a computer-processable medium; and
   logic stored on the computer-processable medium, the logic operable to combine, for each of a plurality of stacks, a specified number of sub-stacks into the stack, each sub-stack comprising a specified number of epochs; to group the stacks into pairs of stacks, each pair of stacks comprising a first stack and a second stack, the epochs included in the first stack adjacent to the epochs included in the second stack; to sum, for each pair of stacks, the first stack and the second stack to generate a first result stack; to subtract, for each pair of stacks, the second stack from the first stack to generate a second result stack; to evaluate the first result stacks and the second result stacks to identify pseudorange peaks; and to align the message data bits based on a magnitude of the identified pseudorange peaks.

8. The system of claim 7, the logic operable to evaluate the first result stacks and the second result stacks to identify pseudorange peaks by determining which of the first and second result stacks has a greater absolute value.

9. The system of claim 8, the logic further operable to evaluate the first result stacks and the second result stacks to identify pseudorange peaks by determining a sign for the corresponding message data based on a polarity for the result having the greater absolute value.

10. The system of claim 7, the specified number of epochs comprising five and the specified number of sub-stacks comprising four.

11. The system of claim 7, the specified number of epochs comprising four and the specified number of sub-stacks comprising five.

12. The system of claim 7, each message data bit comprising twenty epochs.

13. A system for aligning message data bits in positioning signals received at a ranging receiver, the positioning signals comprising a plurality of epochs, the system comprising:
means for combining, for each of a plurality of stacks, a specified number of sub-stacks into the stack, each sub-stack comprising a specified number of epochs;
means for grouping the stacks into pairs of stacks, each pair of stacks comprising a first stack and a second stack, the epochs included in the first stack adjacent to the epochs included in the second stack;
means for summing, for each pair of stacks, the first stack and the second stack to generate a first result stack;
means for subtracting, for each pair of stacks, the second stack from the first stack to generate a second result stack;
means for evaluating the first result stacks and the second result stacks to identify pseudorange peaks; and
means for aligning the message data bits based on a magnitude of the identified pseudorange peaks.

14. The system of claim 13, the means for evaluating the first result stacks and the second result stacks to identify pseudorange peaks comprising means for determining which of the first and second result stacks has a greater absolute value.

15. The system of claim 14, the means for evaluating the first result stacks and the second result stacks to identify pseudorange peaks further comprising means for determining a sign for the corresponding message data based on a polarity for the result having the greater absolute value.

16. The system of claim 13, the specified number of epochs comprising five and the specified number of sub-stacks comprising four.

17. The system of claim 13, the specified number of epochs comprising four and the specified number of sub-stacks comprising five.

18. The system of claim 13, each message-data bit comprising twenty epochs.

19. A method for aligning message data bits in positioning signals received at a ranging receiver, the positioning signals comprising a plurality of epochs, the method comprising:

combining, for each of a plurality of partial stacks, a first specified number of epochs;

combining, for each of a plurality of refining epochs, a second specified number of epochs;

generating a plurality of stacks, each stack comprising a partial stack and a specified number of refining epochs;

grouping the stacks into pairs of stacks, each pair of stacks comprising a first stack and a second stack, the epochs included in the first stack adjacent to the epochs included in the second stack;

adding, for each pair of stacks, the first stack and the second stack to generate a first result stack;

adding, for each pair of stacks, a refining epoch adjacent to a beginning of the first stack to the first result stack to generate a second result stack;

subtracting, for each pair of stacks, a refining epoch at an end of the second stack from the second result stack to generate a third result stack;

adding, for each pair of stacks, a refining epoch adjacent to the end of the second stack to the first result stack to generate a fourth result stack;

subtracting, for each pair of stacks, a refining epoch at the beginning of the first stack from the fourth result stack to generate a fifth result stack;

evaluating the third result stacks and the fifth result stacks to identify pseudorange peaks; and aligning the message data bits based on a magnitude of the identified pseudorange peaks.

20. The method of claim 19, evaluating the third result stacks and the fifth result stacks to identify pseudorange peaks comprising determining which of the third and fifth result stacks has a greater absolute value.

21. The method of claim 20, evaluating the third result stacks and the fifth result stacks to identify pseudorange peaks further comprising determining a sign for the corresponding message data based on a polarity for the result having the greater absolute value.

22. The method of claim 19, the first specified number of epochs comprising sixteen, the second specified number of epochs comprising two, and the specified number of refining epochs comprising four.

23. A method for aligning message data bits in positioning signals received at a ranging receiver, the positioning signals comprising a plurality of epochs, the method comprising:
generating a plurality of sub-stacks, each sub-stack based on a specified number of epochs;
combining a specified number of sub-stacks into each of a plurality of stacks;
grouping the stacks into pairs of stacks;
determining a sum and a difference for each pair of stacks;
correlating the sums and differences with a Gold code for each satellite to determine pseudorange peaks; and
determining coarse alignment based on a magnitude of the pseudorange peaks.

24. The method of claim 23, further comprising:
identifying partial stacks and refining epochs based on the epochs;
combining a partial stack and a specified number of refining epochs into each of a plurality of stacks;
determining epoch sums for the refining epochs;
shifting the stacks based on the refining epochs; and
determining refined alignment based on the shifted stacks.

* * * * *